United States Patent [19]
Jackson

[11] Patent Number: 6,043,755
[45] Date of Patent: *Mar. 28, 2000

[54] SYSTEMS AND METHODS EMPLOYING A PLURALITY OF SIGNAL AMPLITUDES TO RECORD THE PRESENCE OF MULTIPLE OBJECTS

[76] Inventor: Jerome D. Jackson, 211 N. Union St., Suite 100, Alexandria, Va. 22314

[ * ] Notice: This patent is subject to a terminal disclaimer.

[21] Appl. No.: 09/181,478

[22] Filed: Oct. 28, 1998

Related U.S. Application Data

[63] Continuation of application No. 08/645,492, May 13, 1996, Pat. No. 5,864,301.

[51] Int. Cl.⁷ ........................................................ H04Q 5/22
[52] U.S. Cl. ................................. 340/825.54; 340/825.69; 340/825.72; 340/572; 342/42
[58] Field of Search ......................... 340/825.54, 825.69, 340/825.72, 571, 572; 342/42, 44, 51

[56] References Cited

U.S. PATENT DOCUMENTS

| | | | |
|---|---|---|---|
| 5,426,423 | 6/1995 | Raimbault et al. | 340/825.35 |
| 5,864,301 | 1/1999 | Jackson | 340/825.54 |

*Primary Examiner*—Michael Horabik
*Assistant Examiner*—Anthony A. Asongwed

[57] ABSTRACT

A system and method for identifying objects. A preferred embodiment employs a radio transceiver on each object. Each article is identified by recording an amplitude at which the respective transceiver exhibits a nonlinearity.

25 Claims, 20 Drawing Sheets

2030

FREQUENCY TRANSMITTED AT ANTENNA 1110

SYSTEMS AND METHODS EMPLOYING A PLURALITY OF SIGNAL AMPLITUDES TO RECORD THE PRESENCE OF MULTIPLE OBJECTS

This Application is a continuation of application Ser. No. 08/645,492 of JEROME D. JACKSON filed May 13, 1996 now U.S. Pat. No. 5,864,301. The contents of application Ser. No. 08/645,492 filed May 13, 1996 is herein incorporated by reference.

BACKGROUND OF THE INVENTION

1. Field of the Invention

This invention relates generally to a system and method for identifying objects and, more particularly, to a system for identifying objects having transceiver tags.

2. Description of Related Art

Automatic identification systems employing radio sensitive tags have been proposed for tracking of people, animals, vehicles and baggage. For example, U.S. Pat. No. 5,204,681, issued Apr. 20, 1993 to Greene, describes a system having a target affixed to an object to be identified, a transmitter for generating interrogation signals, and a receiver having a signal processor for detecting a target. Each target includes multiple resonators resonant at respective frequencies. The resonant frequencies associated with a particular target are a subset of the frequencies detectable by the receiver, and provide the target with identification data.

A problem with the system described in U.S. Pat. No. 5,204,681 is that the system may not be able to identify a target in the presence of other targets. When more than one target is present, the signal processor may be unable to correlate the combination of detected resonant frequencies with any particular target, because the detected combination will not correspond to any one target, but will instead correspond to the combined set of resonant frequencies from all of the targets.

This problem may be addressed to some extent with a detection amplitude threshold for each resonant frequency. With this thresholding scheme, the signal processor does not consider a resonant frequency to be present unless the received amplitude is over the threshold. A problem with this scheme is that, in order to identify each object, the movement of the objects relative to the transmitter and receiver must be highly regimented such that at any one time only one target is transmitting signals to the receiver above the threshold.

SUMMARY OF THE INVENTION

It is an object of the present invention to provide a system and method for identifying an object in the presence of other objects.

According to an aspect of the present invention, in a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, a method comprises detecting, for each circuit, the respective amplitude level by varying an amplitude used to transmit the interrogation signal to the plurality of articles; and registering the presence of each article, in response to the previous step.

According to another aspect of the present invention, in a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, a method comprises detecting, for each circuit, the respective amplitude level by varying an amplitude used to transmit the interrogation signal to the plurality of articles; and recording the presence of each article, in response to the previous step.

According to another aspect of the present invention, there is apparatus for a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal. The apparatus comprises a detector that detects, for each circuit, the respective amplitude level by varying an amplitude used to transmit the interrogation signal to the plurality of articles, and performing a comparison; and a recorder that records the presence of each article, in response to the comparison.

According to another aspect of the present invention, in a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, an apparatus comprises means for detecting, for each circuit, the respective amplitude level by varying an amplitude used to transmit the interrogation signal to the plurality of articles, and performing a comparison; and means for recording the presence of each article, in response to the comparison.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENTS

Figure 1:
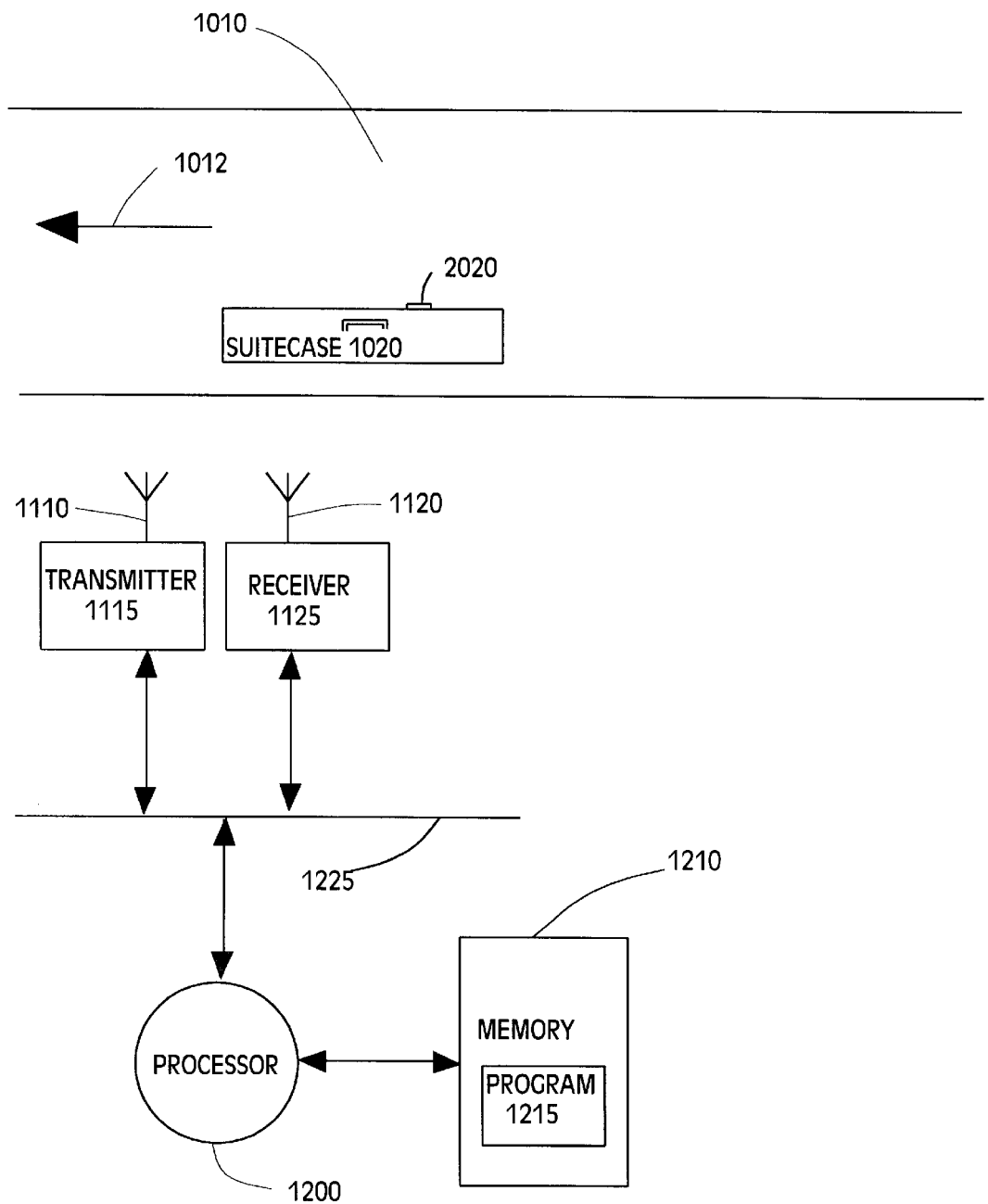
FIG. 1 is a diagram of an article identification system in accordance with a first preferred embodiment of the present invention.

FIG. 1 shows an article identification system 1000 in according to a first preferred embodiment of the present invention. System 1000 includes a conveyor belt 1010 for moving suitcase 1020 in the direction of arrow 1012. Label 2020 is attached to suitcase 1020. Transmitter 1115 and antenna 1110 transmit interrogations signals to label 2020. Receiver 1125 and antenna 1120 receive response signals from label 2020. Processor 1200 controls transmitter 1115 and receiver 1125 by sending commands signals over signal bus 1225. Processor 1200 executes program 1215 stored in memory 1210.

Figure 2:
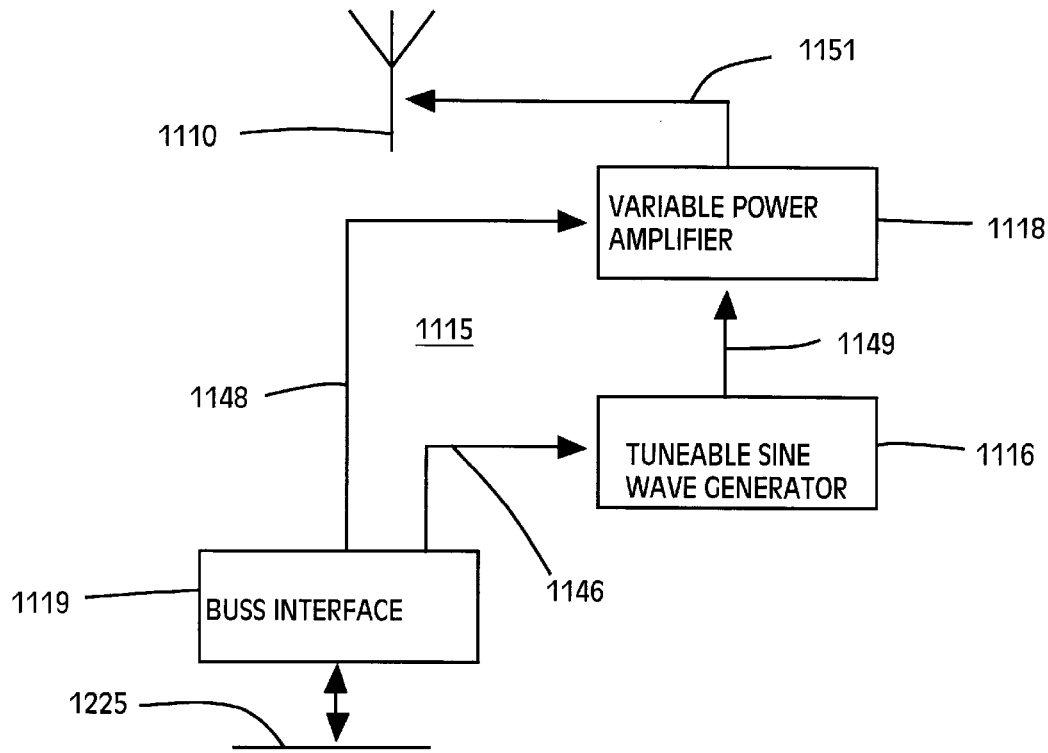
FIG. 2 is a block diagram of the transmitter shown in FIG. 1.

FIG. 2 shows a block diagram of transmitter 1115. Tunable sine wave generator 1116 receives a frequency select command from processor 1200, through bus interface 1119 and signal line 1146, and sends a sinusoid signal of the selected frequency to variable power amplifier 1118 via signal line 1149. Amplifier 1118 receives a power select command from processor 1200 through buss interface 1119 and signal line 1148. Amplifier 1118 amplifies the sinusoid signal and sends the amplified signal to antenna 1110 via signal line 1151, causing antenna 1110 to radiate the amplified signal at the selected power.

Figure 3:
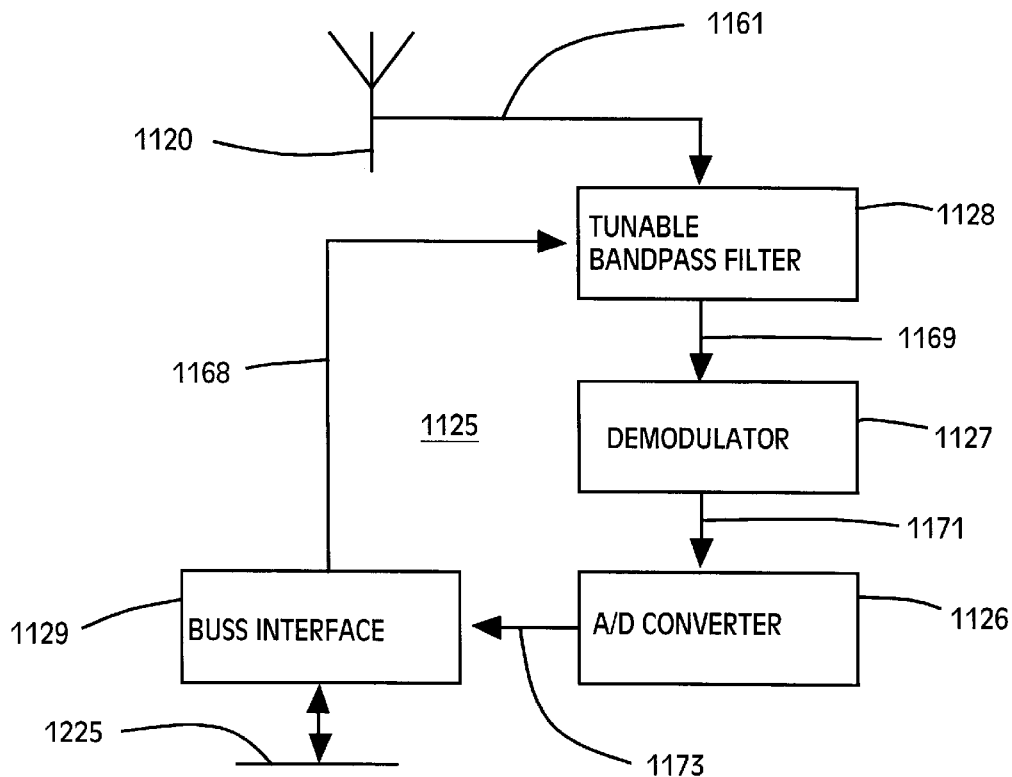
FIG. 3 is a block diagram of the receiver shown in FIG. 1.

FIG. 3 shows a block diagram of receiver 1125 shown in FIG. 1. Tunable band pass filter 1128 receives a band select command from processor 1200, through bus interface 1129 and signal line 1168, and filters out signals received from antenna 1120 that are outside of the selected band. Filter 1128 passes the filtered signal to demodulator 1127 via signal line 1169. Demodulator 1127 is an amplitude modulation detector. Demodulator 1127 passes the demodulated signal via signal line 1171 to A/D converter 1126, which converts the level received from demodulator 1127 into a digital number, and sends the digital number to processor 1200 through signal line 1173 and bus interface 1129.

The time constant of demodulator 1127 should be relatively long so that the output of demodulator 1127 will have little ripple, allowing processor 1200 to discriminate between small changes in signal level. Although this long time constant makes it difficult to detect rapid changes in signal level, the preferred system does not require such rapid detection, as will be apparent from the description below.

Figure 4:
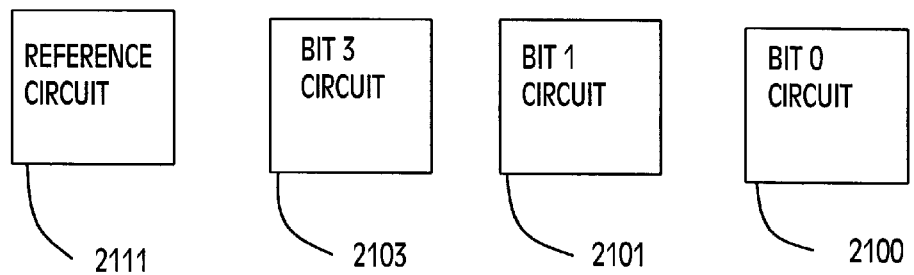
FIG. 4 is a block diagram of an identification label in the first preferred system.

FIG. 4 shows label 2020 attached to suitcase 1020. Label 2020 includes resonant circuits 2111, 2100, 2101, and 2103. Each resonant circuit is configured to respond to a certain received frequency by transmitting at another frequency. Circuits 2111, 2100, 2101, and 2103 are each less than one square inch, and have a uniform orientation. The distance between adjacent resonant circuits is less than one inch. Because of this uniform orientation and small inter-circuit, intra-label, separation distances, and because the distance between the label 2020 and transmitting antenna 1110 is at least several feet, each of the resonant circuits within label 2020 has a substantially common orientation relative to antenna 1110. Similarly, because the distance between label 2020 and receiving antenna 1120 is at least several feet, each of the resonant circuits within label 2020 has a substantially common orientation relative to antenna 1120.

Figure 5:
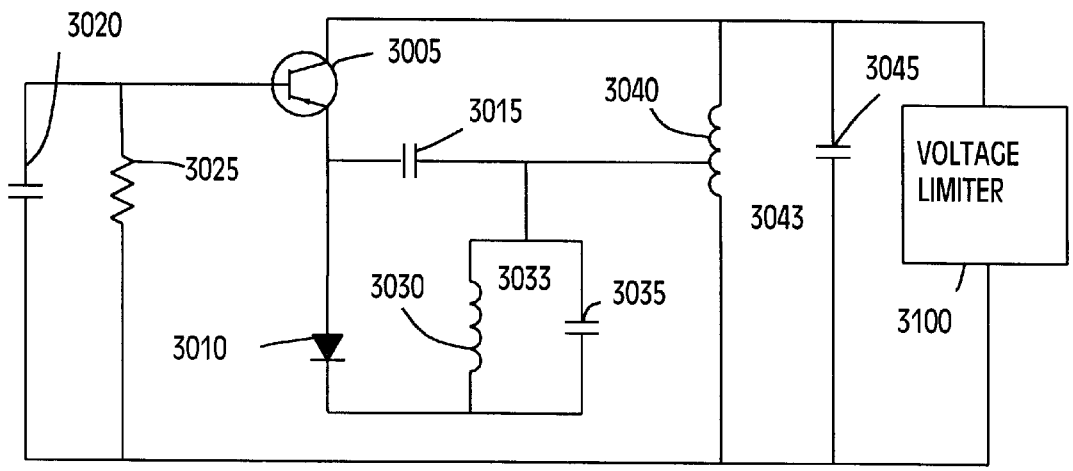
FIG. 5 is a diagram of one of the circuits shown in FIG. 4.

FIG. 5 shows resonant circuit 2111. Inductor 3030 and capacitor 3035 constitute a tank circuit functioning as the receiver 3033 of circuit 3000, with inductor 3030 functioning as the antenna of the receiver. Transistor 3005, diode 3010, capacitor 3020, resistor 3025, and capacitor 3015 function as a power supply, with capacitor 3020 functioning as an AC bypass and resistor 3025 functioning to bias transistor 3005. The receiver and power supply of circuit 2111 are described in more detail in U.S. Pat. No. 3,859,652, issued Jan. 7, 1975 to Hall et al., the contents of which is herein incorporated by reference.

Inductor 3040, capacitor 3045, and voltage limiter 3100 function as the transmitter of circuit 2111, with inductor 3040 functioning as the antenna of the transmitter. Circuit 2111 responds to a signal having a frequency Tref, radiated by antenna 1110, by transmitting a signal having a frequency Rref. It is presently preferred that capacitor 3045 be a thin film capacitor having a capacitance substantially independent from the voltage across capacitor 3045.

Figure 6:
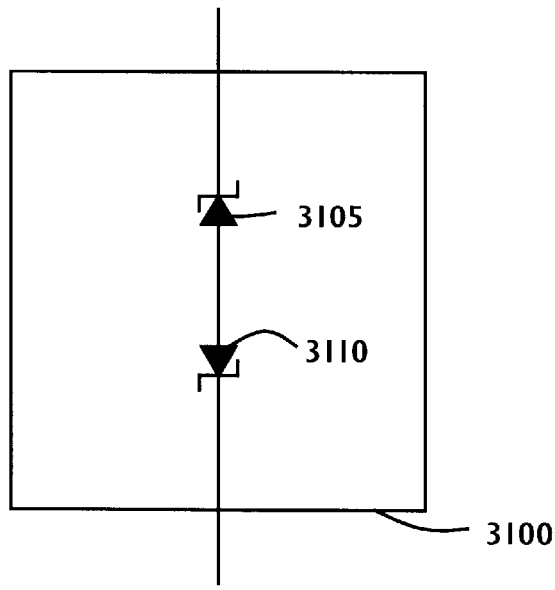
FIG. 6 is a diagram of a device in the circuit shown in FIG. 5.

FIG. 6 shows voltage limiter 3100 of the circuit of FIG. 5. Zener diode 3105 and 3110 are each diffused PN junction devices having heavy doping on the substrate side of the junction, and having a tunnel breakdown voltage of several volts. The anode of zener diode 3105 is coupled to the anode of zener diode 3110. The cathode of zener diode 3105 constitutes the first terminal of voltage limiter 3100, and the cathode of zener diode 3110 constitutes the second terminal of voltage limiter 3100. Zener diodes 3105 Osand 3110 limit the intensity of the signal transmitted by circuit 2111 at frequency Rref.

The natural frequency of transmitter 3043 is essentially determined by inductor 3040 capacitor 3045, and parasitic capacitances in circuit 2111. For example, to achieve a transmitter resonance of approximately 0.93 Megahertz (Rref=0.93 Megahertz), inductor 3040 may be 5,800 $\mu\mu$henries and capacitor 3045 may be 5 microfarads.

Similarly, the natural frequency of receiver 3033 is essentially determined by inductor 3030 and capacitor 3035. In other words, the receiver resonance of circuit 2111 (Tref) is controlled by inductor 3030 and capacitor 3035.

Figure 7:
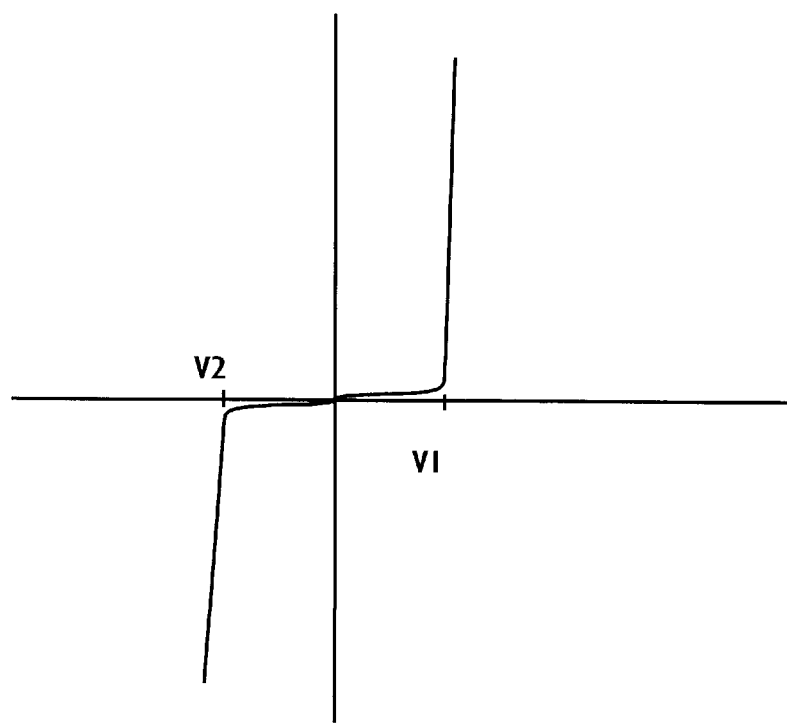
FIG. 7 is a curve of the current-voltage characteristics of the device shown in FIG. 6.

FIG. 7 shows the current-voltage characteristic of voltage limiter 3100. As shown in FIG. 7, circuit 3100 sinks a substantial amount of current when the voltage across the first and second terminals exceeds V1 or -V2. V1 is a function of the zener breakdown voltage of diode 3110 plus the forward bias current drop of diode 3105. Similarly, V2 is a function of the zener breakdown voltage of diode 3105 plus the forward bias current drop of diode 3110.

Figure 8A:
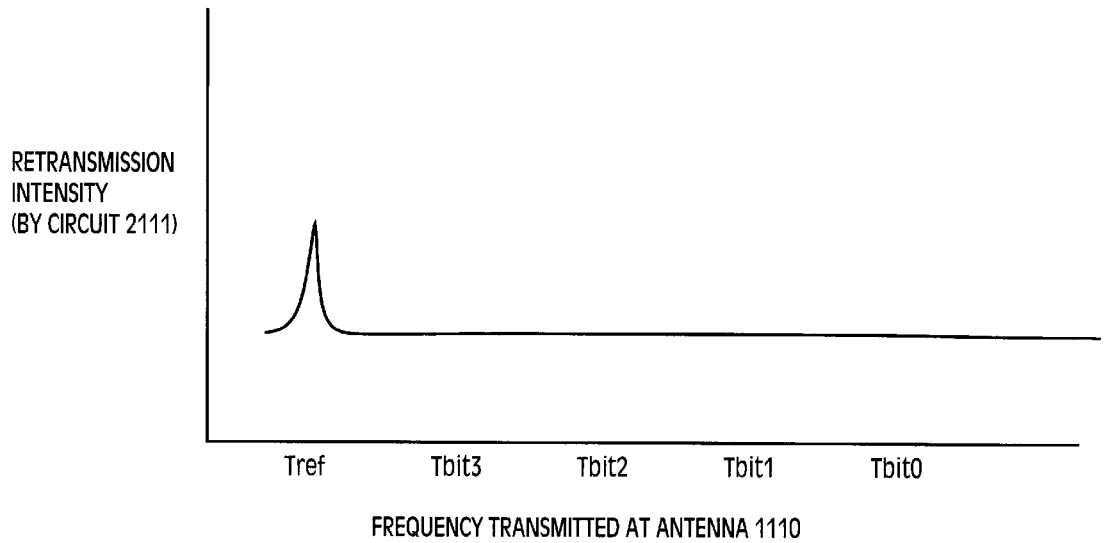
FIG. 8A. is a curve of the frequency response of one of the circuits shown in FIG. 4.
Figure 8B:
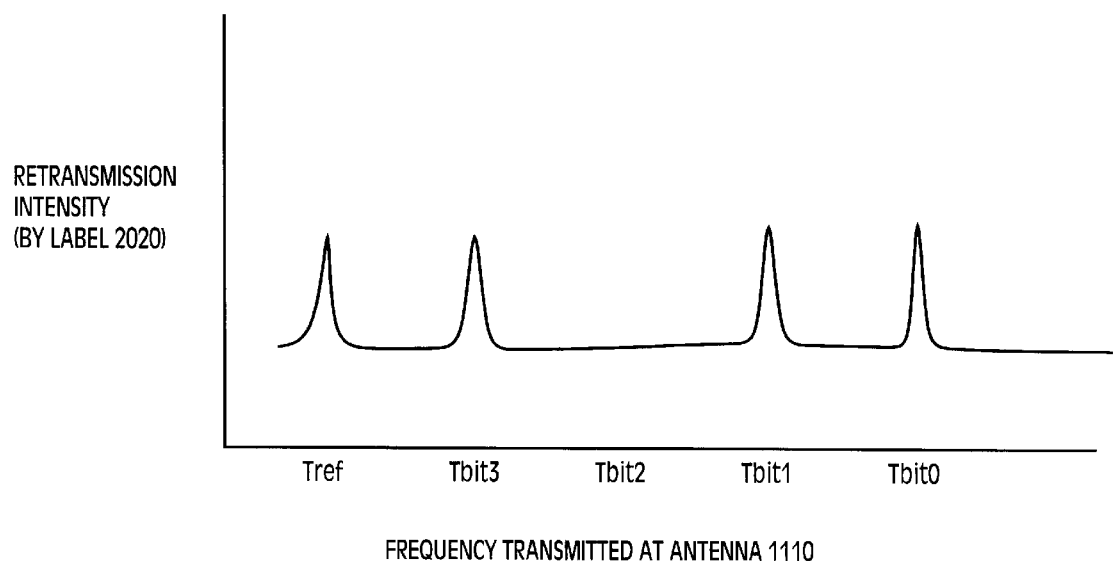
FIG. 8B is a curve of the frequency response of th e label shown in FIG. 4.

FIGS. 8A and 8B are frequency response curves. (The curves shown in FIGS. 8A and 8B do not directly represent processing performed by processor 1200 and program 1215 but are included in this description because they illustrate a relevant characteristic of the circuits in label 2020). FIG. 8A represents a retransmission response of circuit 2111, which transmits at a frequency Rref. As shown in FIG. 8A, when transmitter 1110 transmits at a frequency Tref, the intensity of the signal transmitted by circuit 2111 is at a maximum.

Circuits 2103, 2101, and 2100 have a structure similar to that of circuit 2111 described above, except that each resonant circuit has component values corresponding to its respective resonant frequency.

FIG. 8B represents a composite retransmission response of label 2020. This composite response is determined by the combination of circuits 2111, 2100, 2101, 2103. Circuit 2111 transmits at a frequency Rref, and transmits at a maximum intensity when it receives a signal Tref transmitted by antenna 1110. Circuit 2103 transmits at a frequency Rbit3, and transmits at a maximum intensity when it receives a frequency Tbit3 transmitted by antenna 1110. Circuit 2101 transmits at a frequency Rbit1, and transmits at a maximum intensity when it receives a frequency Tbit1 transmitted by antenna 1110. Circuit 2100 transmits at a frequency Rbit0, and transmits at a maximum intensity when it receives a frequency Tbit0 transmitted by antenna 1110. In other words, the natural frequency of transmitter 3043 in circuit 2111 is Rref, the natural frequency of transmitter 3043 in circuit 2103 is Rbit3, the natural frequency of transmitter 3043 in circuit 2101 is Rbit1, and the natural frequency of transmitter 3043 in circuit 2100 is Rbit0. The natural frequency of receiver 3033 in circuit 2111 is Tref, the natural frequency of receiver 3033 in circuit 2103 is Tbit3, the natural frequency of receiver 3033 in circuit 2101 is Tbit1, and the natural frequency of receiver 3033 in circuit 2100 is Tbit0.

Label 2020 represents a number having 4 bit positions, each position corresponding to a respective frequency. Label 2020 represents the number 1011 because label 2020 has circuits corresponding to bit positions 0, 1, and 3, and has no circuit corresponding to bit position 2. More specifically, circuit 2100 corresponds to bit position 0 because circuit 2100 has a maximum response at transmitted frequency Tbit0. Circuit 2101 corresponds to bit position 1 because circuit 2101 has a maximum response at Tbit1. Circuit 2103 corresponds to bit position 3 because circuit 2103 has a maximum response at transmitted frequency Tbit3.

Processor 1200 detects the value of a particular bit by varying the power transmitted by transmitter 1115 at the frequency corresponding to the particular bit, e.g. frequency Tbit0, to detect whether a breakpoint is present. The presence of a breakpoint means the corresponding bit is 1 and the absence of a breakpoint means the corresponding bit is 0. Processor 1200 follows this procedure for each bit position, to detect the value of the label. In other words, processor 1200 detects the number 1011 by sequentially transmitting on each frequency (Tbit3, Thit2, Tbit1 and Tbit0) and detecting an intensity (average power) at antenna 1120, as described in more detail below.

Each label includes a reference circuit having a maximum response at Tref, regardless of the value of the label.

Figure 9A:
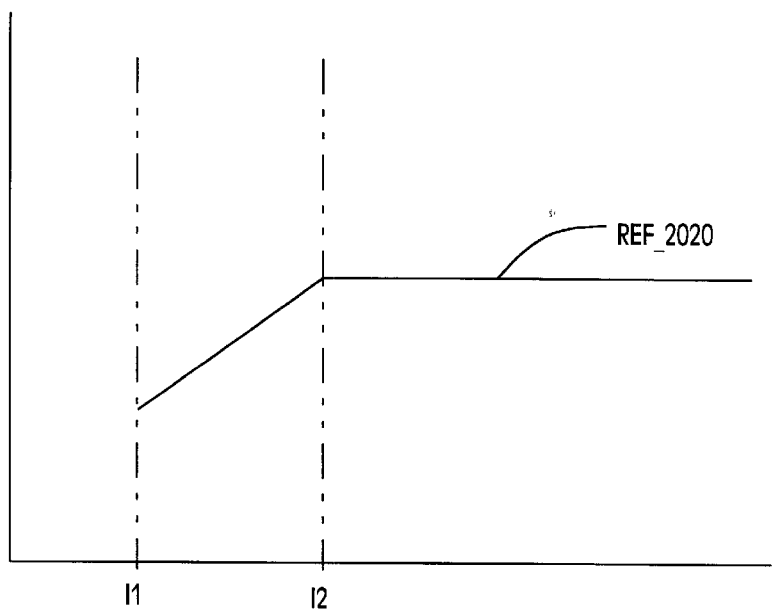
FIG. 9A–9E are power curves generated by the first preferred system at different frequencies.

FIG. 9A shows a curve $REF_{13}$ 2020 of signal intensity (average power) on line 1171 at the output of demodulator 1127, versus signal intensity (average power) transmitted by transmitter 1115, when band pass filter 1128 is set to a band having a center frequency at Rref and sine wave generator 1116 is set to a frequency Tref. The curve REF_2020 results from the response of circuit 2111. Between transmitted intensities I1 and I2, the signal on line 1171 is an increasing function of intensity transmitted by transmitter 1115 until the transmitting intensity reaches a breakpoint at I2, at which point the response of circuit 2111 flattens. Voltage limiter 3100 in circuit 2111 causes this flattened response by limiting the voltage in transmitter 3043 in circuit 2111, and by detuning transmitter 3043 as the increasing voltage in transmitter 3043 changes the capacitance of the PN junctions in voltage limiter 3100.

Label 2020 may be conceptualized as a circuit composed of multiple circuits (circuits 2111, 2103, 2101, and 2100). Label 2020 receives a first signal (from antenna 1110) and transmits a second signal, the second signal being a function of the first signal, the function having a nonlinearity at a first transmission amplitude (I2) corresponding to a first frequency (Tref) of the first signal.

Figure 9B:
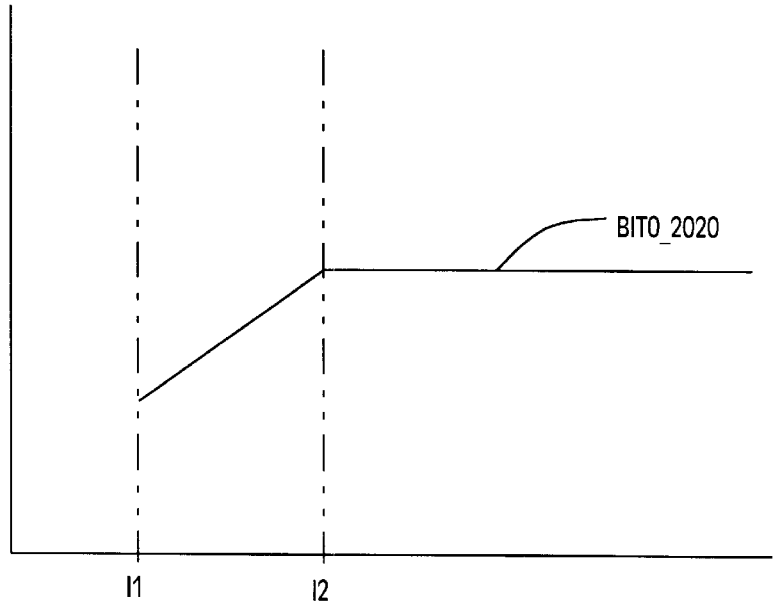

FIG. 9B shows a curve $BIT0_{13}$ 2020 of signal intensity on line 1171 at the output of demodulator 1127, versus signal intensity transmitted by transmitter 1115, when band pass filter 1128 is set to a band having a center frequency at Rbit0, and sine wave generator 1116 is set to a frequency Tbit0. The curve BIT0_2020 results from the response of circuit 2100. Between transmitted intensities I1 and I2, the signal on line 1171 is an increasing function of intensity transmitted by transmitter 1115 until the transmitting intensity reaches a breakpoint at I2, at which point the response of circuit 2100 flattens. Voltage limiter 3100 in circuit 2100 causes this flattened response by limiting the voltage in transmitter 3043 in circuit 2100, and by detuning transmitter 3043 as the increasing voltage in transmitter 3043 changes the capacitance of the PN junctions in voltage limiter 3100.

Figure 9C:
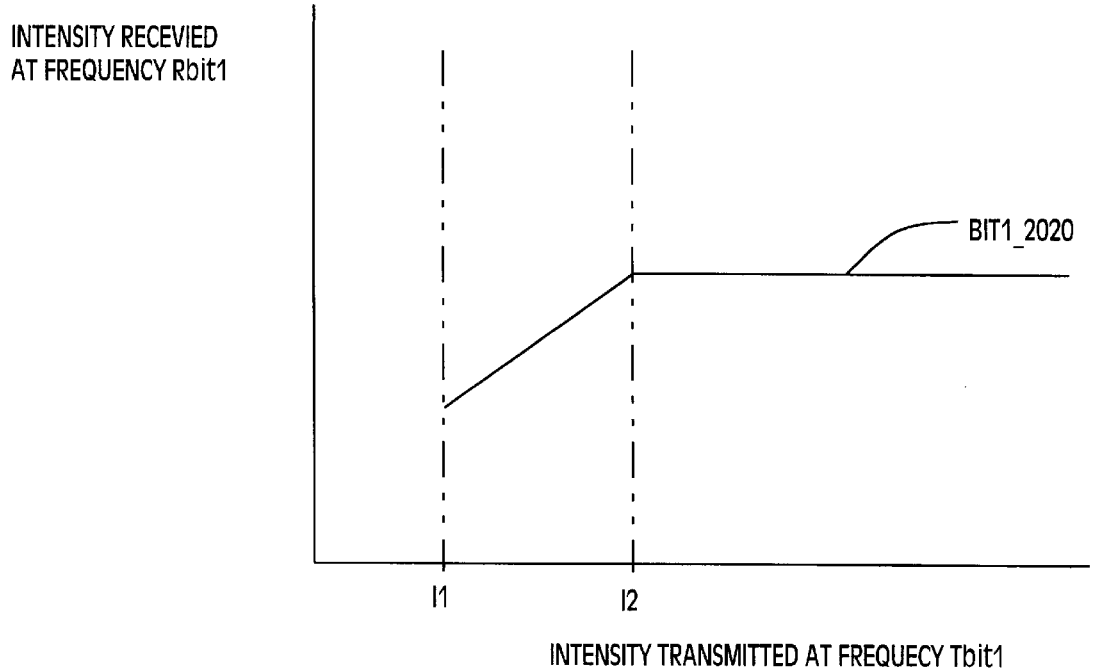

FIG. 9C shows a curve BIT1_2020 of signal intensity on line 1171 at the output of demodulator 1127, versus signal intensity transmitted by transmitter 1115, when band pass filter 1128 is set to a band having a center frequency at Rbit1, and sine wave generator 1116 is set to a frequency Tbit1. The BIT1_2020 results from the response of circuit 2101. Between transmitted intensities I1 and I2, the signal on line 1171 is an increasing function of intensity transmitted by transmitter 1115 until the transmitting intensity reaches a breakpoint at I2, at which point the response of circuit 2101 flattens. Voltage limiter 3100 in circuit 2101 causes this flattened response by limiting the voltage in transmitter 3043, and by detuning transmitter 3043 as the increasing voltage in transmitter 3042 changes the capacitance of the PN junctions in voltage limiter 3100.

Figure 9D:
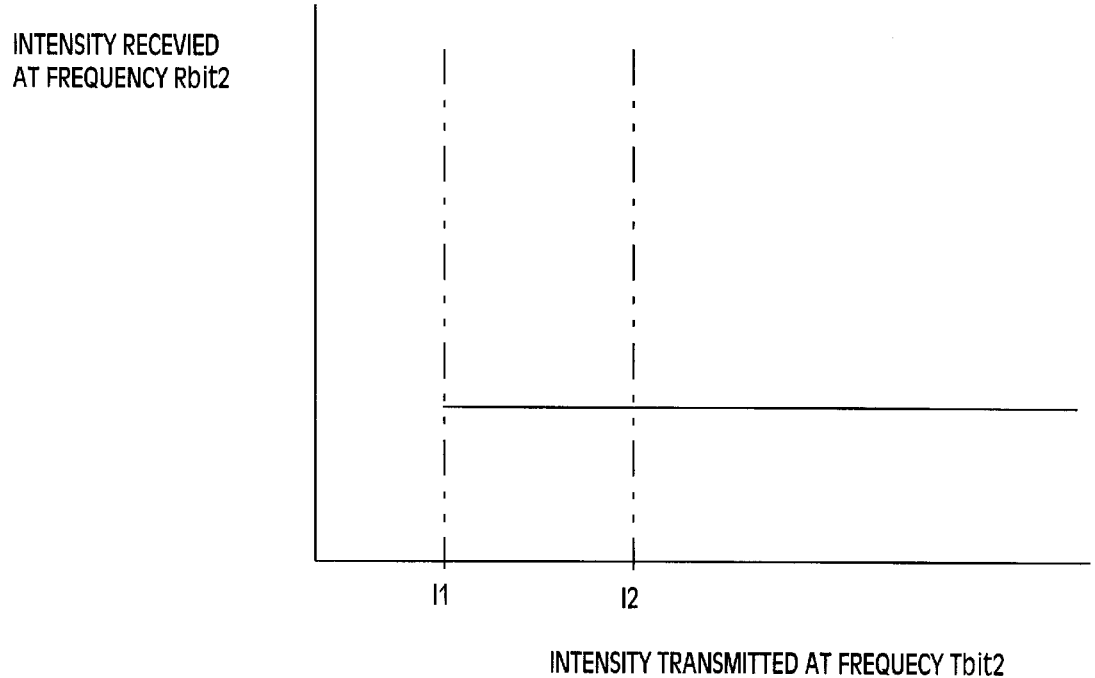

FIG. 9D shows a curve of signal intensity on line 1171 at the output of demodulator 1127, versus signal intensity transmitted by transmitter 1115, when band pass filter 1128 is set to a band having a center frequency at Rbit2, and sine wave generator 1116 is set to a frequency Tbit2. The curve shown in FIG. 9D has no breakpoint because label 2020 has no circuit corresponding to bit 2. In other words, the curve shown in FIG. 9D has no breakpoint because there is no resonant circuit corresponding to transmitted frequency Tbit2 and received frequency Rbit2, in proximity to antenna 1110.

Figure 9E:
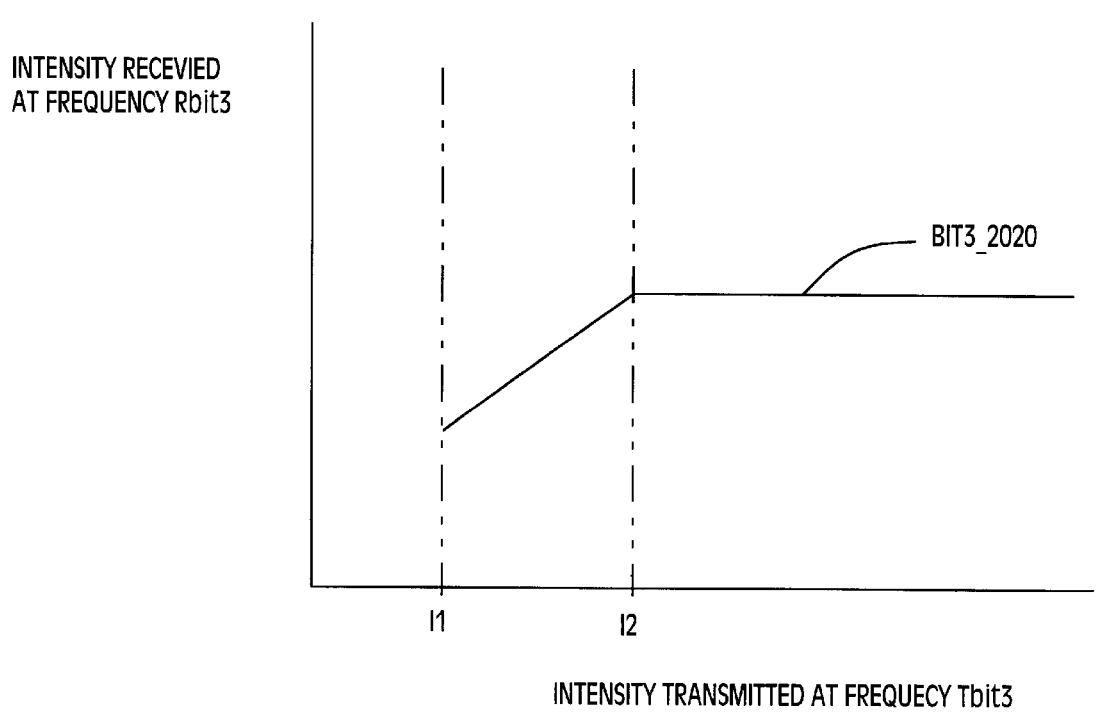

FIG. 9E shows a curve BIT3_2020 of signal intensity on line 1171 at the output of demodulator 1127, versus signal intensity transmitted by transmitter 1115, when band pass filter 1128 is set to a band having a center frequency at Rbit3, and sine wave generator 1116 is set to a frequency Tbit3. The curve BIT3__2020 results from the response of circuit 2103. Between transmitted intensities I1 and I2, the signal on line 1171 is an increasing function of intensity transmitted by transmitter 1115 until the transmitting intensity reaches a breakpoint at I2, at which point the response of circuit 2111 flattens. Voltage limiter 3100 in circuit 2103 causes this flattened response by limiting the voltage in transmitter 3043 in circuit 2103, and by detuning transmitter 3043 as the increasing voltage in transmitter 3043 changes the capacitance of the PN junctions in voltage limiter 3100.

Figure 10:
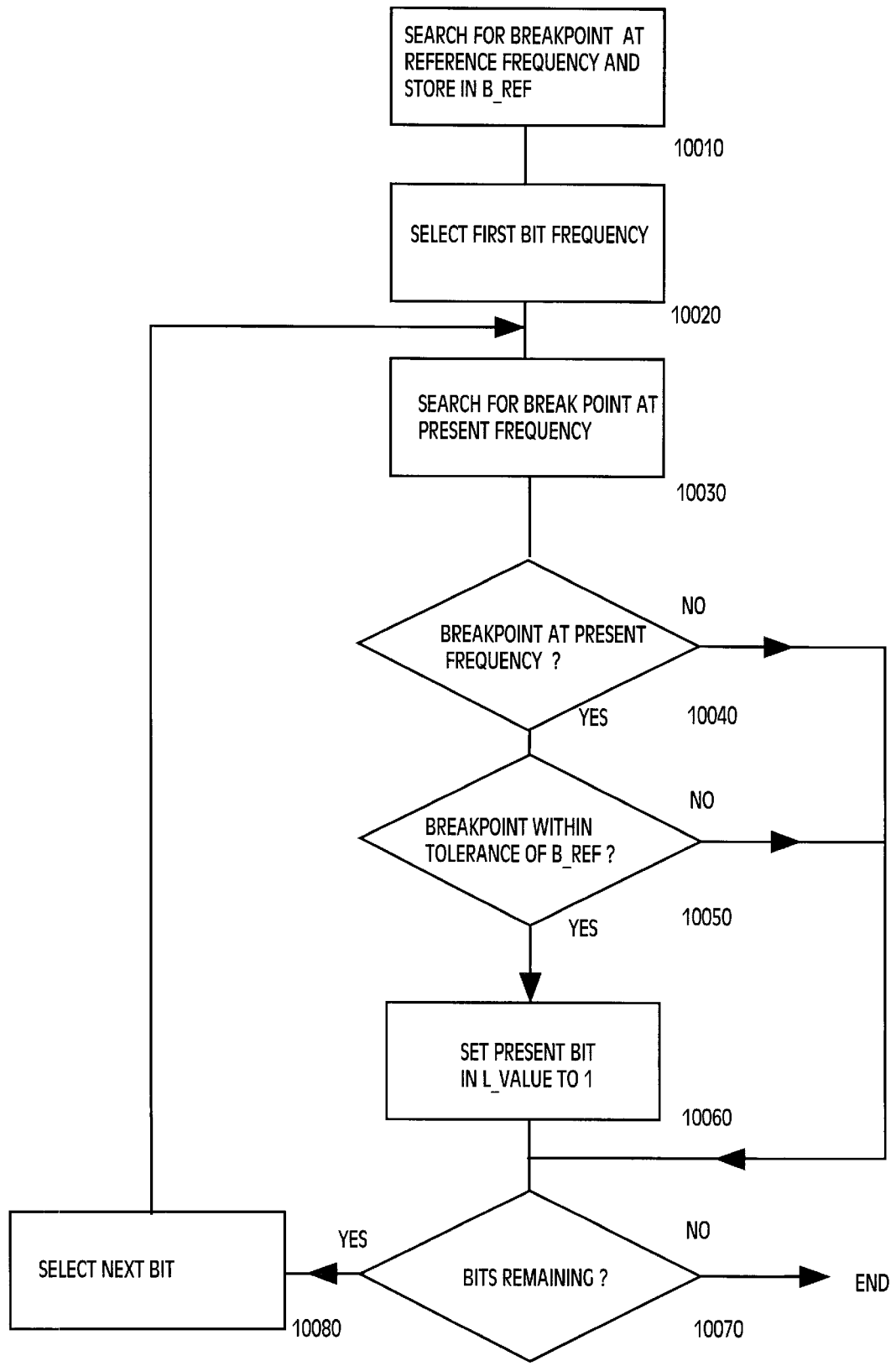
FIG. 10. is a flow chart of a processing performed by the first preferred system.

FIG. 10 shows a procedure, performed by processor 1200 and program 1215, for reading label 2020 on suitcase 1020. First, processor 1200 detects a breakpoint at the reference frequency, by varying the intensity of the signal transmitted on antenna 1110, and saves the breakpoint in a variable B__REF. (step 10010). Next, Processor 1200 sets the system to detect the least significant bit of label 2020, by setting sine wave generator 1116 to the frequency Tbit0 and setting band pass filter 1128 to a band centered around Rbit0 (step 10020). In step 10020, processor 1200 also sets a variable L__VALUE to 0000. Processor 1200 then searches for a breakpoint at the presently selected bit frequency, by varying the intensity of the signal transmitted on antenna 1110 (step 10030). If a breakpoint exists at the presently selected frequency, step 10030 sets a variable B__PRESENT to the intensity of the breakpoint. If there is a breakpoint at the present bit frequency (step 10040), processor 1200 determines whether the breakpoint at the present bit frequency is within a certain range of the breakpoint at the reference frequency (step 10050). In other words, step 10050 performs the comparison:

ABS($B_{13}$ PRESENT—B__REF) <=TOLERANCE, where ABS is the absolute value function, B__PRESENT is the breakpoint found in step 10030, and TOLERANCE is a constant. If the breakpoint at the present bit is within this range, processor 1200 sets the present bit in L__VALUE (step 10060).

As described above, step 10050 disregards any breakpoints that are not in proximity to the breakpoint of the reference circuit in label 2020. These disregarded breakpoints may correspond to circuits in other labels (labels other than label 2020). Thus, in the first preferred system, signals from other labels are rejected as noise.

Steps 10070 and 10080 repeat steps 10030, 10040, 10050, and 10060 for each bit position and corresponding frequency. More specifically, processor 1200 executes step 10030–10060 a first time, at which time step 10060 changes L__VALUE from 0000 to 0001. Processor 1200 then selects the next bit frequency by setting sine wave generator 1116 to frequency Tbit1 and setting band pass filter 1128 to a band having a center frequency at Rbit1 (step10080). Processor 1200 then reexecutes steps 10030–10060, at which time step 60 changes L__VALUE from 0001 to 0011.

Subsequently, processor 1200 selects the next bit frequency by setting sine wave generator 1116 to frequency Tbit2 and setting band pass filter 1128 to a band having a center frequency at Rbit2 (step 10080). Because no breakpoint exists for the second bit, processor 1200 does not execute steps 10050 and 10060, and L__VALUE does not change.

Subsequently, processor 1200 selects the next bit by setting sine wave generator 1116 to a frequency Tbit3 and setting band pass filter 1128 to a band having a center at Rbit3 (step 10080), and reexecutes steps 10030–10060, at which time L__VALUE changes from 0011 to 1011.

Thus, processor 1200 determines a set of other frequencies (Tbit0, Tbit, and Tbit3) of the first signal at which the second signal has a nonlinearity at a first signal amplitude corresponding to the first transmission amplitude (an amplitude within tolerance of I2).

At the end of the procedure shown in FIG. 10, L__VALUE will equal 1011. Thus, L__VALUE stores an article identification signal corresponding to suitcase 1020.

Figure 11:
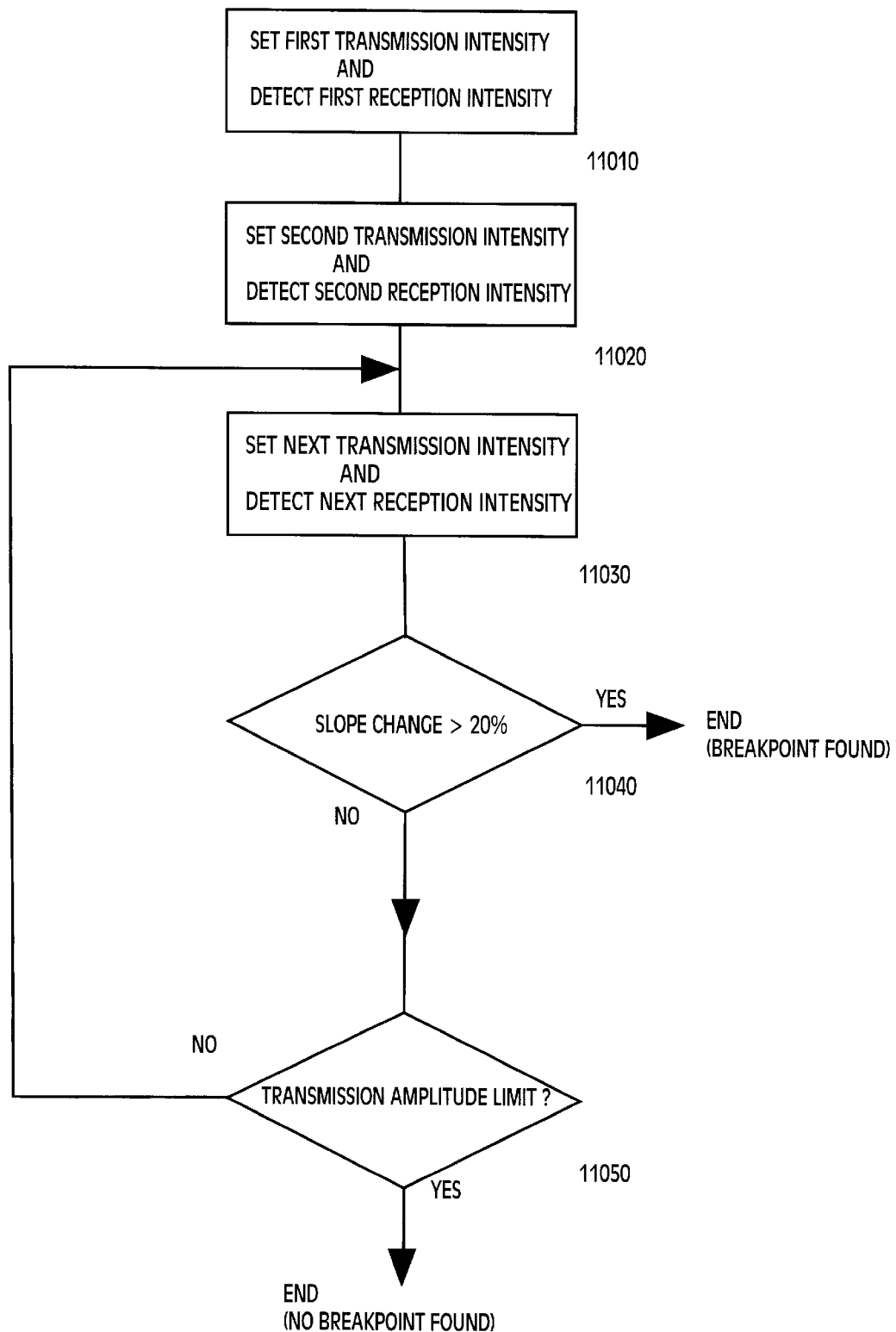
FIG. 11 is a flow chart of a part of the processing shown in FIG. 6.

FIG. 11 shows a subprocedure of step 10010 and 10030 of FIG. 10. The procedure of FIG. 11 collects data points along a response curve, such as the curve shown in FIG. 9A, by incrementally increasing the transmitted signal intensity. To determine where a breakpoint exists, processor 1200 processes the curve by segments, and detects whether the difference in slope of any two adjacent segments is greater than a certain threshold. More specifically, processor 1200 causes amplifier 1118 to transmit an initial intensity (I1) on antenna 1110, and detects a received intensity (through antenna 1120, filter 1128, demodulator 1127, and A/D converter 1126) by squaring the value on signal line 1173 at the output of A/D converter 1126 (step 11010). Processor 1200 then causes amplifier 1118 to transmit at a second intensity, higher than the initial intensity, and detects a second received intensity by squaring the value on signal line 1173 (step 11020). Processor 1200 then causes amplifier 1118 to transmit at the next higher intensity, and detects another received intensity (step 11030). Processor 1200 then compares a difference between the slope of the current segment and the slope of the previous segment, by comparing the absolute value of the quantity $$\frac{SLOPE_P - SLOPE_T}{SLOPE_P}$$

to 0.2 (11040). If this difference in slope is greater than 0.2, a break point exists and the procedure of FIG. 11 terminates. If this difference in slope in not greater than 0.2, it is determined whether the transmission intensity limit has been reached (step 11050). If the limit has not been reached, processor 1200 repeats steps 11030 and 11040. If the limit has been reached, no breakpoint exists, and the procedure of FIG. 11 terminates.

$$SLOPE_T = \frac{RECEIVED_T - RECEIVED_{T-1}}{TRANSMITTED_T - TRANSMITTED_{T-1}},$$

where TRANSMITTED$_T$ is the intensity transmitted by amplifier 1118 in step 11030 and RECEIVED$_T$ is the intensity detected by squaring the output of A/D converter 1126 in step 11030. TRANSMITTED$_{T-1}$ is the intensity transmitted in the transmit and detect step previous to step 11030 and RECEIVED$_{T-}$ is the intensity detected in the transmit and detect step previous to step 11030. This previous transmit and detect step will be step 11020, the first time through the loop, or a previous invocation of step 11030, subsequent times through the loop.

$$SLOPE_P = \frac{RECEIVED_2 - RECEIVED_1}{TRANSMITTED_2 - TRANSMITTED_1},$$

where TRANSMITTED $_T$ is the intensity transmitted in step 11010, RECEIVED$_1$ is the intensity received in step 11010, TRANSMITTED$_2$ is the intensity transmitted in step 11020, and RECEIVED$_2$ is the intensity received in step 11020.

Figure 12:
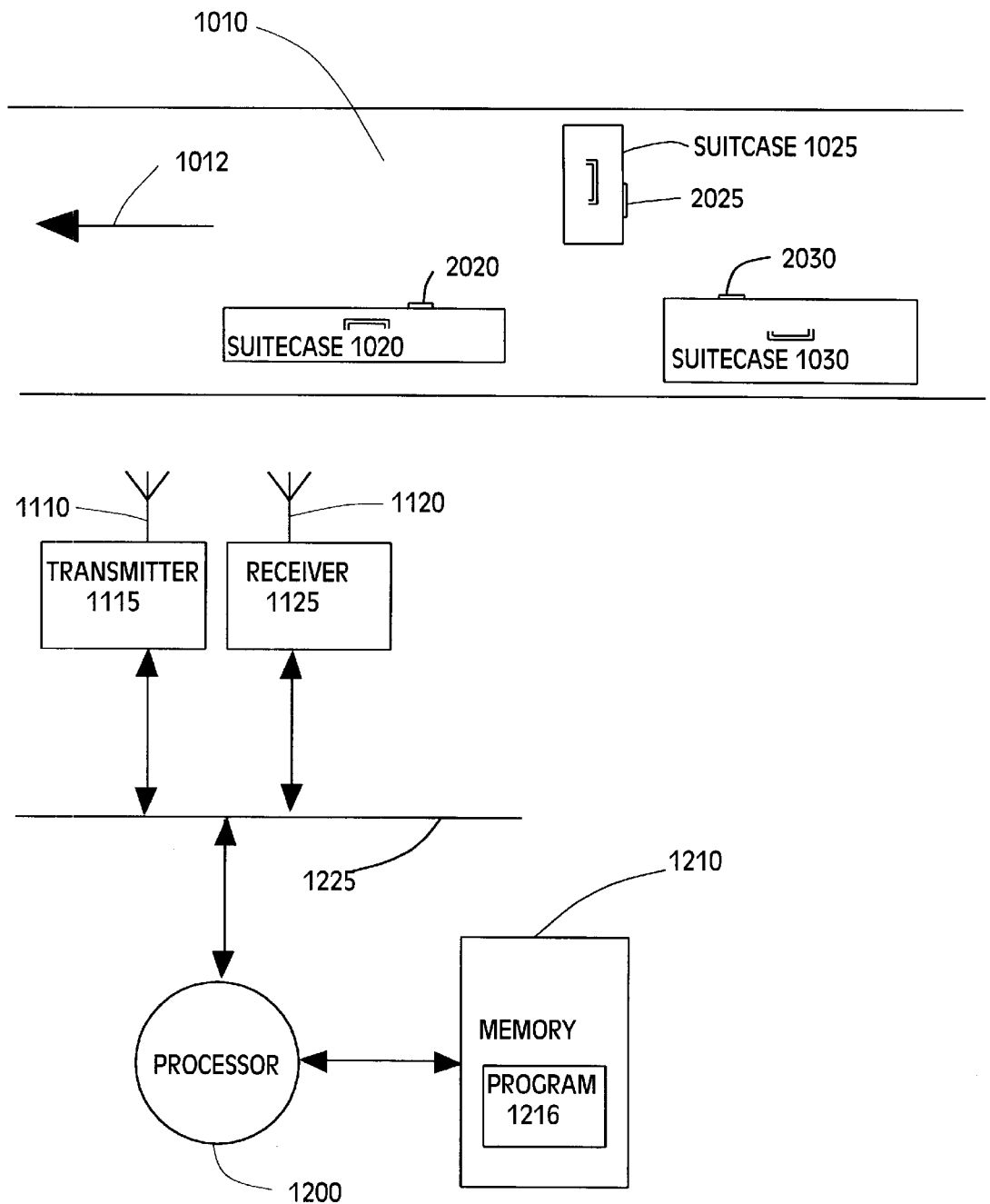
FIG. 12 is a diagram of an article identification system in accordance with a second preferred embodiment of the present invention.

FIG. 12 shows an article identification system 8000 in accordance with a second preferred embodiment of the present invention. System 8000 includes a conveyor belt 1010 for moving suitcases 1020, 1025, and 1030 in the direction of arrow 1012. Label 2020 is attached to suitcase 1020, label 2025 is attached to suitcase 1025, and label 2030 is attached to suitcase 1030. Transmitter 1115 and antenna 1110 transmit interrogation signals to labels 2020, 2025, and 2030. Receiver 1125 and antenna 1120 receive response signals from labels 2020, 2025, and 2030. Processor 1200 controls transmitter 1115 and receiver 1125 by sending commands signals over signal bus 1225. Processor 1200 executes program 1216 stored in memory 1210.

In the Figures describing the second preferred system, elements corresponding to elements in the first preferred system are designated with corresponding reference numbers.

Labels 2025 and 2030 each have a structure similar to label 2020, including multiple resonant circuits. The labels differ from each other, however, in the combination of resonant frequencies associated with a particular label. While label 2020 has resonant frequencies corresponding to the respective frequencies of circuits 2111, 2100, 2101, and 2103, label 2025 has a different set of resonant circuits and therefore a different set of corresponding resonant frequencies. Similarly, label 2030 has its own set of resonant frequencies.

Figure 13:
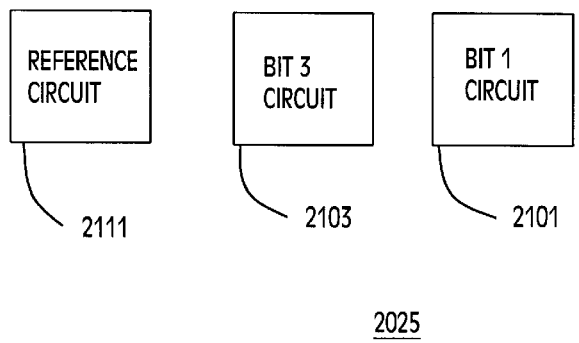
FIG. 13 block diagram of an identification label in the second preferred system.

FIG. 13 shows label 2025 attached to suitcase 1025. Label 2025 includes resonant circuits 2111, 2101, and 2103. Label 2025 is flat so that each of the resonant circuits has a substantially common orientation relative to antenna 1110, and each of the resonant circuits has a substantially common orientation relative to antenna 1120.

Figure 14:
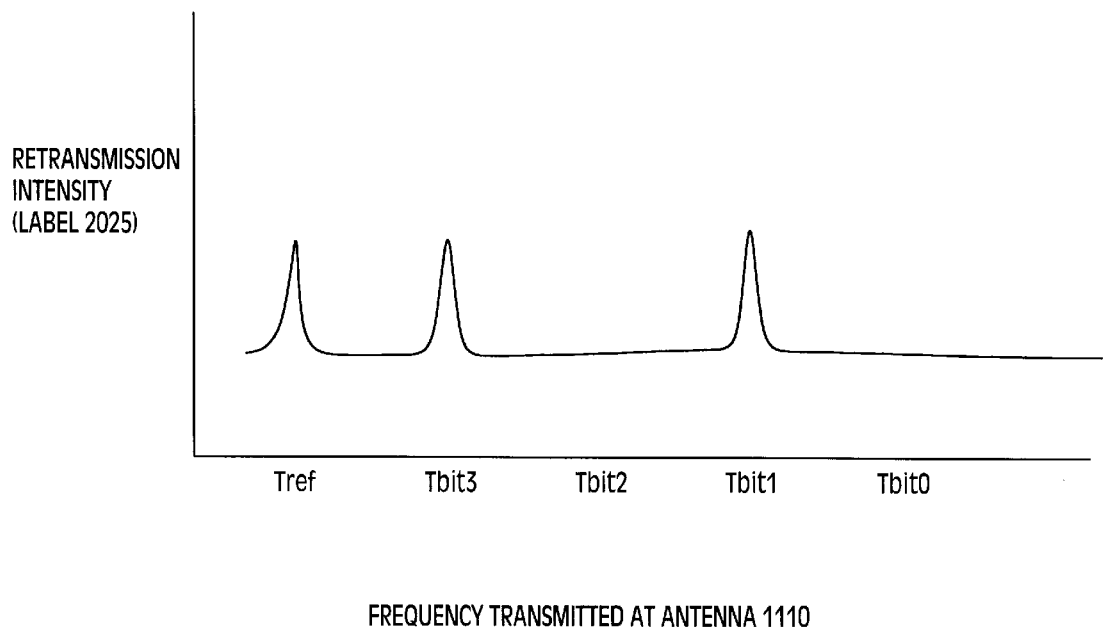
FIG. 14 is a curve of the frequency response of the label shown in FIG. 13.

FIG. 14 represents a composite retransmission response of label 2025. This composite response is determined by the combination of circuits 2111, 2101, and 2103. Label 2025 represents a number having 4 bit positions, each position corresponding to a respective frequency. Label 2025 represent the number 1010 because label 2025 has circuits corresponding to bit positions 1 and 3, and has no circuits corresponding to bit positions 0 and 2.

Figure 15:
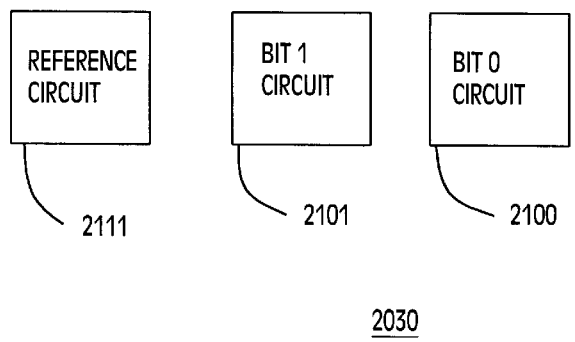
FIG. 15 block diagram of another identification label in the second preferred system.

FIG. 15 shows label 2030 attached to suitcase 1030. Label 2030 includes resonant circuits 2111, 2101, and 2100. Label 2030 is flat so that each of the resonant circuits has a substantially common orientation relative to antenna 1110, and each of the resonant circuits has a substantial common orientation relative to antenna 1120.

Figure 16:
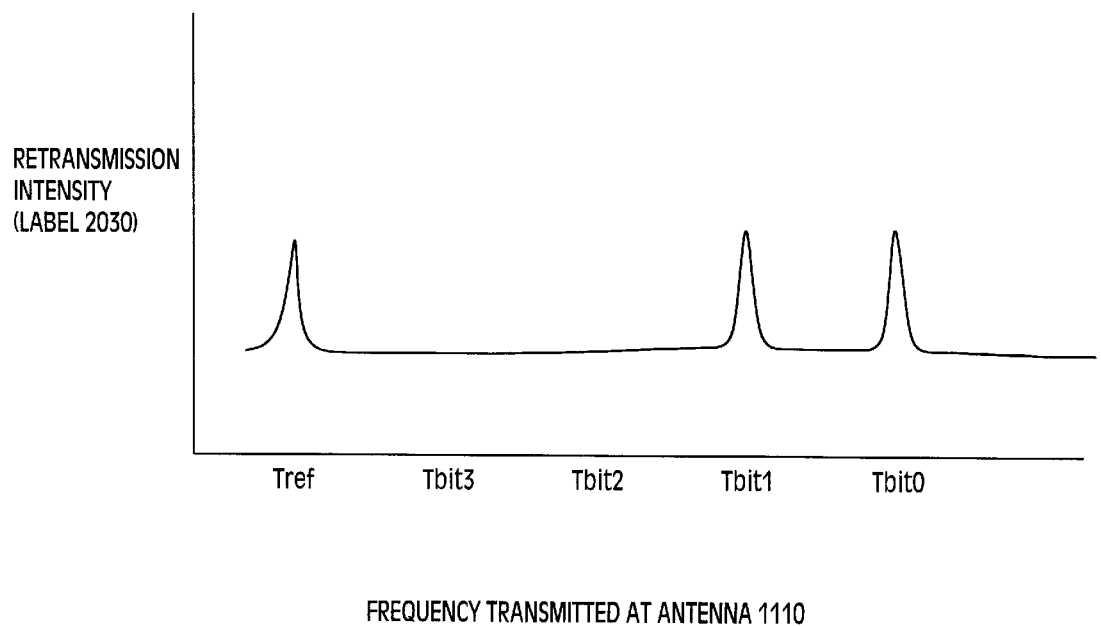
FIG. 16 is a curve of the frequency response of the label shown in FIG. 15.

FIG. 16 represents a composite retransmission response of label 2030. This composite response is determined by the combination of circuits 2111, 2100, and 2101. Label 2030 represents a number having 4 bit positions, each position corresponding to a respective frequency. Label 2030 represent the number 0011 because label 2030 has circuits corresponding to bit positions 0 and 1, and has no circuits corresponding to bit positions 2 and 3.

Figure 17A:
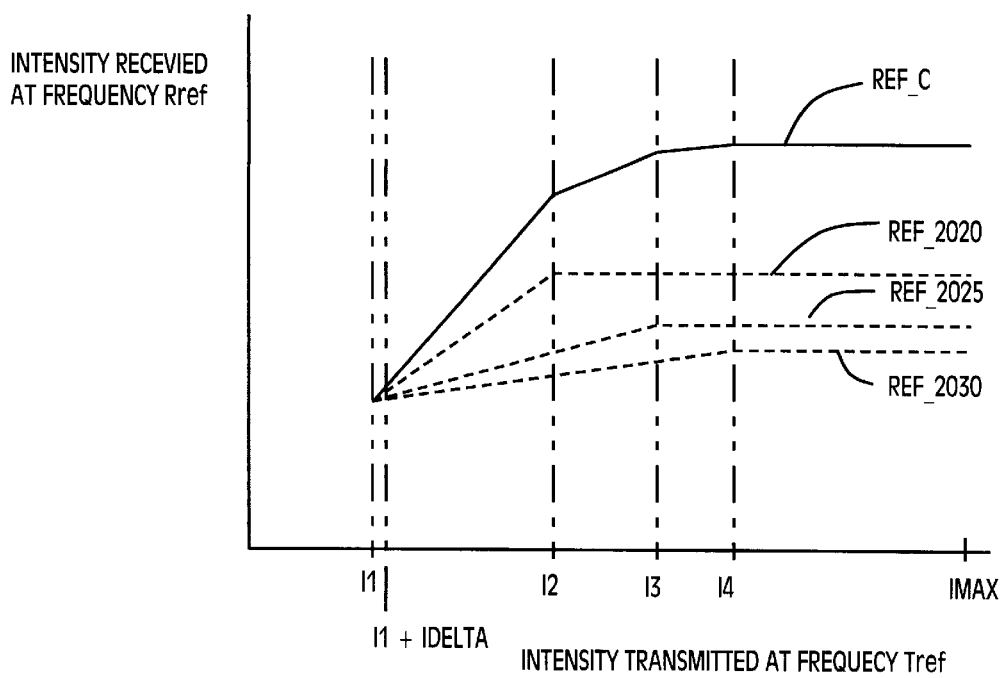
FIG. 17A–17E are power curves generated by the second preferred system at different frequencies.

FIG. 17A shows a curve REF_C of signal intensity (average power) on line 1171 at the output of demodulator 1127, versus signal intensity (average power) transmitted by transmitter 1118, when band pass filter 1128 is set to a band having a center frequency at Rref, and sine wave generator 1116 is set to a frequency Tref. The curve REF_C shown in FIG. 17A is a result of the added intensities of the signals retransmitted by circuit 2111 in label 2020, circuit 2111 in label 2025, and circuit 2111 in label 2030. The dotted curve REF_2020, having a slope of 0.71 between intensities I1 and I2 and a slope of 0 for intensities greater than I2, represents the contribution of circuit 2111 in label 2020. The dotted curve REF_2025, having a slope of 0.27 between intensities I1 and I3 and a slope of 0 for intensities greater than I3, represents the contribution of circuit 2111 in label 2025. The dotted curve REF_2030, having a slope of 0.14 between intensities I1 and I4 and a slope of 0 for intensities greater than I4, represents the contribution of circuit 2111 in label 2030.

In FIG. 17A, between transmitted intensities I1 and I2, REF_C has a slope of approximately 1.13 until the intensity reaches a breakpoint at I2, at which point the response of circuit 2111 in label 2020 flattens. The respective voltage limiter 3100 in circuit 2111 in label 2020 causes this flattened response at I2 by limiting the voltage in the respective transmitter 3043 in circuit 2111, and by detuning transmitter 3043 as the increasing voltage in transmitter 3043 changes the capacitance of the PN junctions in voltage limiter 3100. Between transmitted intensities I2 and I3, REF_C has a slope of 0.42 until the intensity reaches a breakpoint at I3, at which point the response of circuit 2111 in label 2025 flattens. The respective voltage limiter 3100 in circuit 2111 in label 2025 causes this flattened response at I3 by limiting the voltage in the respective transmitter 3043 in circuit 2111, and by detuning transmitter 3043 as the increasing voltage in transmitter 3043 changes the capacitance of the PN junctions in voltage limiter 3100. Between transmitted intensities I3 and I4, REF_C has a slope of 0.14 until the intensity reaches a breakpoint at I4, at which point the response of circuit 2111 in label 2030 flattens. The respective voltage limiter 3100 in circuit 2111 in label 2030 causes this flattened response at I4 by limiting the voltage in the respective transmitter 3043 in circuit 2111, and by detuning transmitter 3043 as the increasing voltage in transmitter 3043 changes the capacitance of the PN junctions in voltage limiter 3100.

Each of labels 2020, 2025, and 2030 may be conceptualized as a respective a circuit (each composed of multiple resonant circuits) for receiving a first signal and transmitting a respective second signal, the second signal being a function of the first signal, the function having a nonlinearity at a respective first transmission amplitude corresponding to a first frequency (Tref) of the first signal. For label 2020, the first transmission amplitude is I2. For label 2025, the first transmission amplitude is I3. For label 2030, the first transmission amplitude is I4. (See FIG. 17A).

Figure 17B:
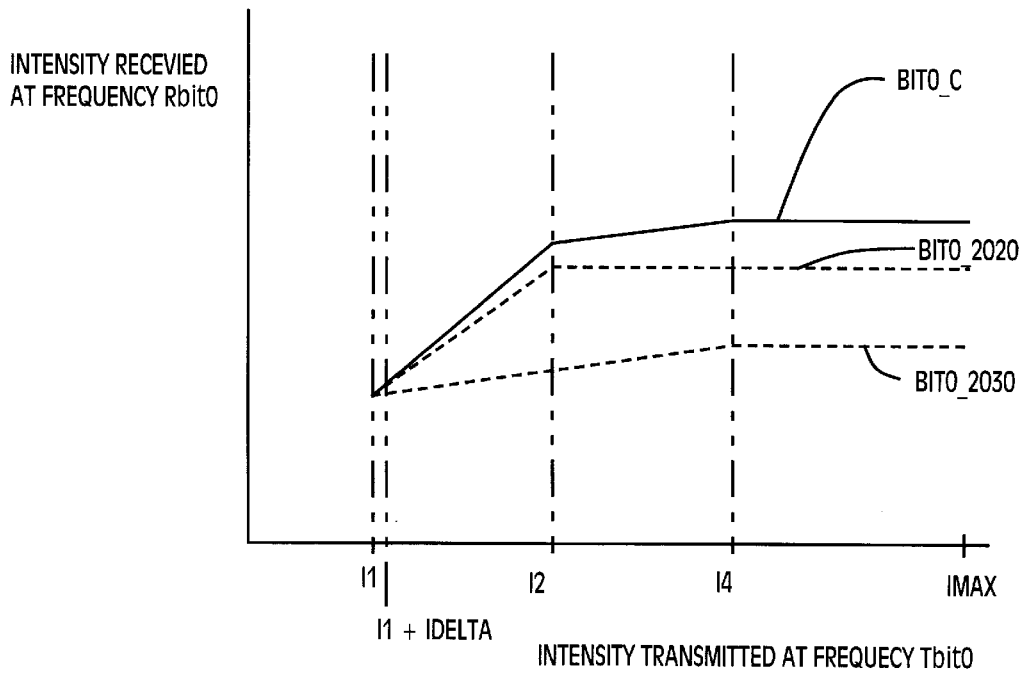

FIG. 17B shows a curve $BIT0_{13}$ C of signal intensity on line 1171 at the output of demodulator 1127, versus signal intensity transmitted by transmitter 1118, when band pass filter 1128 is set to a band having a center frequency at Rbit0, and sine wave generator 1116 is set to a frequency Tbit0. The curve $BIT0_{13}$ C shown in FIG. 17B is a result of the added intensities of the signals retransmitted by circuit 2100 in label 2020, and circuit 2100 in label 2030. The dotted curve BIT0—2020, having a slope of approximately 0.71 between intensities I1 and I2 and a slope of 0 for intensities greater than I2, represents the contribution of circuit 2100 in label 2020. The dotted curve $BIT0_{13}$ 2030, having a slope of approximately 0.14 between intensities I1 and I4 and a slope of 0 for intensities greater than I4, represents the contribution of circuit 2100 in label 2030.

In FIG. 17B, between transmitted intensities I1 and I2, $BIT0_{13}$ C has a slope of approximately 0.85 until the intensity reaches a breakpoint at I2, at which point the response of circuit 2100 in label 2020 flattens. The respective voltage limiter 3100 in circuit 2100 in label 2020 causes this flattened response at I2 by limiting the voltage in the respective transmitter 3043 in circuit 2100, and by detuning transmitter 3043 as the increasing voltage in transmitter 3043 changes the capacitance of the PN junctions in voltage limiter 3100. Between transmitted intensities I2 and I4, BIT0$_{13}$ C has a slope of approximately 0.14 until the intensity reaches a breakpoint at I4, at which point the response of circuit 2100 in label 2030 flattens. The respective voltage limiter 3100 in circuit 2100 in label 2030 causes this flattened response at I4 by limiting the voltage in the respective transmitter 3043 in circuit 2100, and by detuning transmitter 3043 as the increasing voltage in transmitter 3043 changes the capacitance of the PN junctions in voltage limiter 3100.

Figure 17C:
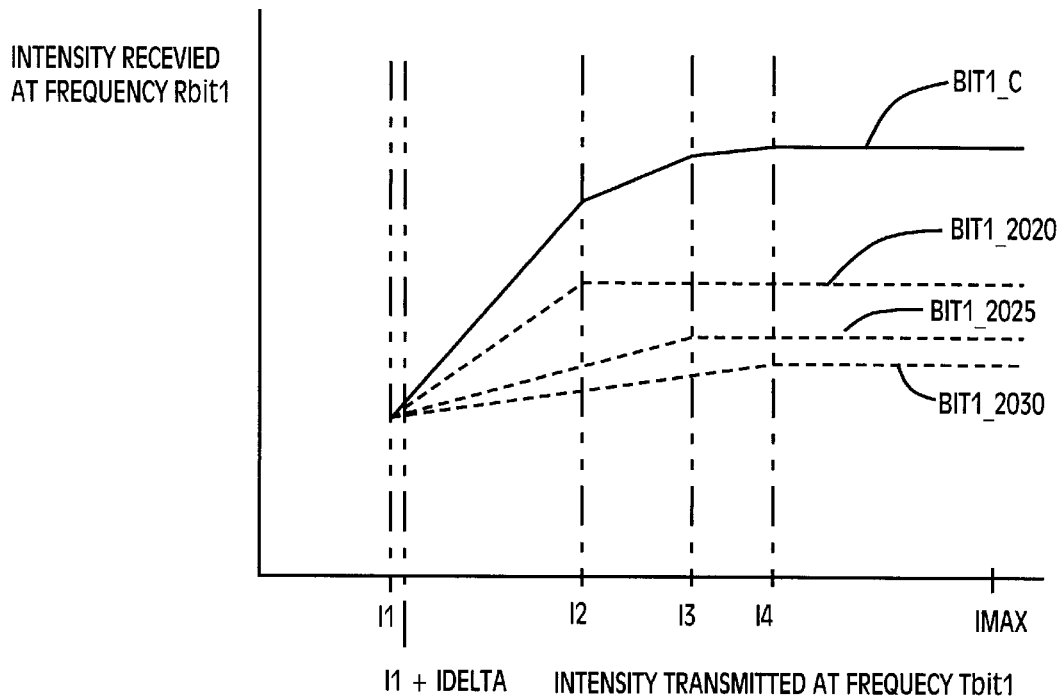

FIG. 17C shows a curve BIT1$_{13}$ C of signal intensity on line 1171 at the output of demodulator 1127, versus signal intensity transmitted by transmitter 1118, when band pass filter 1128 is set to a band having a center frequency at Rbit1, and sine wave generator 1116 is set to a frequency Tbit1. The curve BIT—C shown in FIG. 17C is a result of the added intensities of the signals retransmitted by circuit 2101 in label 2020, circuit 2101 in label 2025, and circuit 2101 in label 2030. The dotted curve BIT1—2020, having a slope of approximately 0.71 between intensities I1 and I2 and a slope of 0 for intensities greater than I2, represents the contribution of circuit 2111 in label 2020. The dotted curve BIT1$_{13}$ 2025, having a slope of approximately 0.27 between intensities I1 and I3 and a slope of 0 for intensities greater than I3, represents the contribution of circuit 2111 in label 2025. The dotted curve BIT1$_{13}$ 2030, having a slope of approximately 0.14 between intensities I1 and I4 and a slope of 0 for intensities greater than I4, represents the contribution of circuit 2111 in label 2030.

In FIG. 17C, between transmitted intensities I1 and I2, BIT1$_{13}$ C has a slope of approximately 1.13 until the intensity reaches a breakpoint at I2, at which point the response of circuit 2101 in label 2020 flattens. The respective voltage limiter 3100 in circuit 2101 in label 2020 causes this flattened response at I2 by limiting the voltage in the respective transmitter 3043 in circuit 2101, and by detuning transmitter 3043 as the increasing voltage in transmitter 3043 changes the capacitance of the PN junctions in voltage limiter 3100. Between transmitted intensities I2 and I3, BIT1$_{13}$ C has a slope of approximately 0.42 until the intensity reaches a breakpoint at I3, at which point the response of circuit 2101 in label 2025 flattens. The respective voltage limiter 3100 in circuit 2101 in label 2025 causes this flattened response at I3 by limiting the voltage in the respective transmitter 3043 in circuit 2101, and by detuning transmitter 3043 as the increasing voltage in transmitter 3043 changes the capacitance of the PN junctions in voltage limiter 3100. Between transmitted intensities I3 and I4, BIT1$_{13}$ C has a slope of approximately 0.14 until the intensity reaches a breakpoint at I4, at which point the response of circuit 2101 in label 2030 flattens. The respective voltage limiter 3100 in circuit 2101 in label 2030 causes this flattened response at I4 by limiting the voltage in the respective transmitter 3043 in circuit 2101, and by detuning transmitter 3043 as the increasing voltage in transmitter 3043 changes the capacitance of the PN junctions in voltage limiter 3100.

Figure 17D:
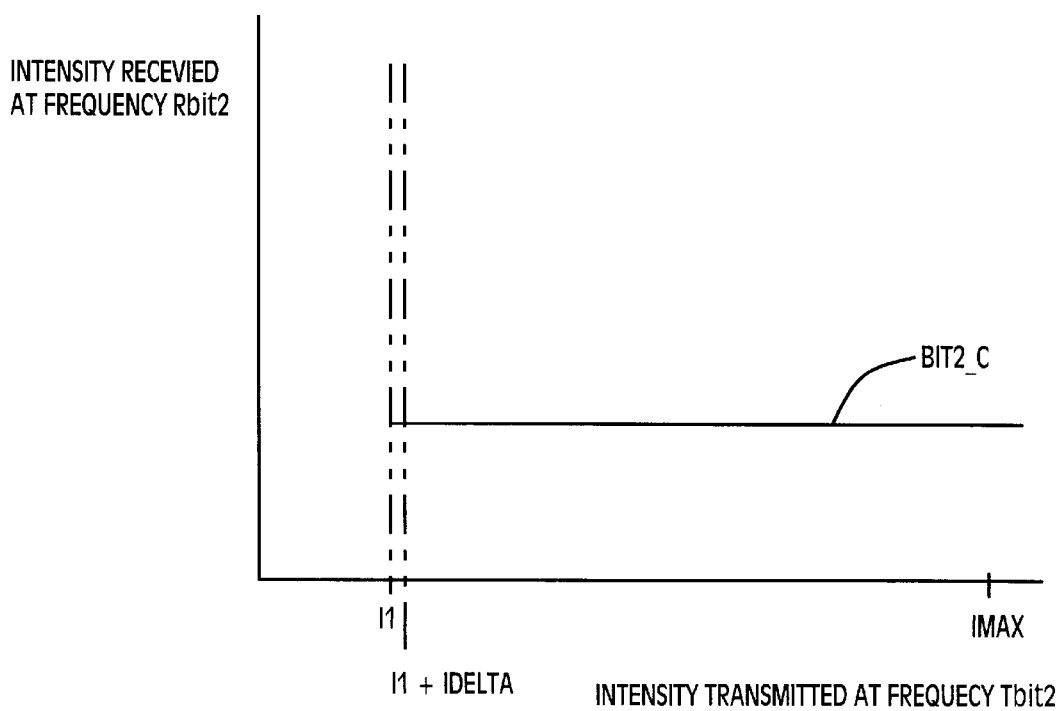

FIG. 17D shows a curve BIT2—C of signal intensity on line 1171 at the output of modulator 1127, versus signal intensity transmitted by transmitter 1118, when band pass filter 1128 is set to a band having a center frequency at Rbit2, and sine wave generator 1116 is set to a frequency Tbit2. The curve BIT2—C shown in FIG. 17D has no breakpoints because none of labels 2020, 2025, and 2030 has a circuit corresponding to bit 2.

Figure 17E:
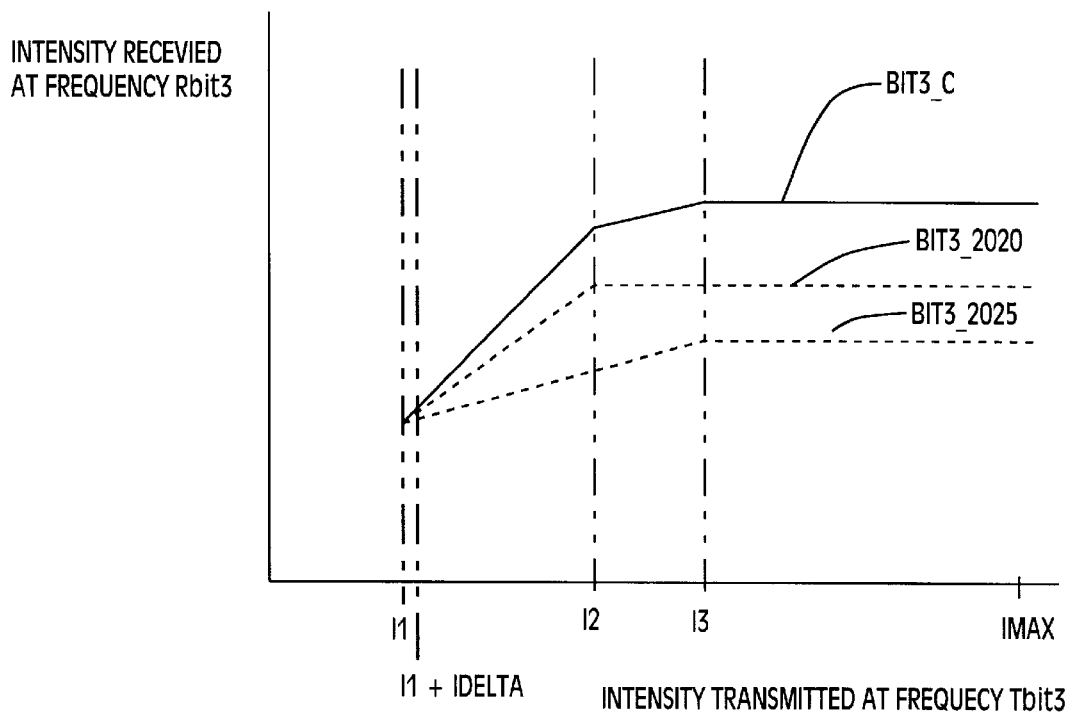

FIG. 17E shows a curve BIT3—C of signal intensity on line 1171 at the output of demodulator 1127, versus signal intensity transmitted by transmitter 1118, when band pass filter 1128 is set to a band having a center frequency at Rbit3, and sine wave generator 1116 is set to a frequency Tbit3. The curve BIT3—C shown in FIG. 17E is a result of the added intensities of the signals retransmitted by circuit 2103 in label 2020, and circuit 2103 in label 2025. The dotted curve BIT3—2020, having a slope of approximately 0.71 between intensities I1 and I2 and a slope of approximately 0 for intensities greater than I2, represents the contribution of circuit 2103 in label 2020. The dotted curve BIT3—2025, having a slope of approximately 0.27 between intensities I1 and I3 and a slope of 0 for intensities greater than I3, represents the contribution of circuit 2103 in label 2025.

In FIG. 17E, between transmitted intensities I1 and I2, BIT3—C has a slope of approximately 0.98 until the intensity reaches a breakpoint at I2, at which point the response of circuit 2103 in label 2020 flattens. The respective voltage limiter 3100 in circuit 2103 in label 2020 causes this flattened response at I2 by limiting the voltage in the respective transmitter 3043 in circuit 2103, and by detuning transmitter 3043 as the increasing voltage in transmitter 3043 changes the capacitance of the PN junctions in voltage limiter 3100. Between transmitted intensities I2 and I3, BIT3—C has a slope of approximately 0.27 until the intensity reaches a breakpoint at I3, at which point the response of circuit 2103 in label 2025 flattens. The respective voltage limiter 3100 in circuit 2103 in label 2025 causes this flattened response at I3 by limiting the voltage in the respective transmitter 3043 in circuit 2103, and by detuning transmitter 3043 as the increasing voltage in transmitter 3043 changes the capacitance of the PN junctions in voltage limiter 3100.

Figure 18:
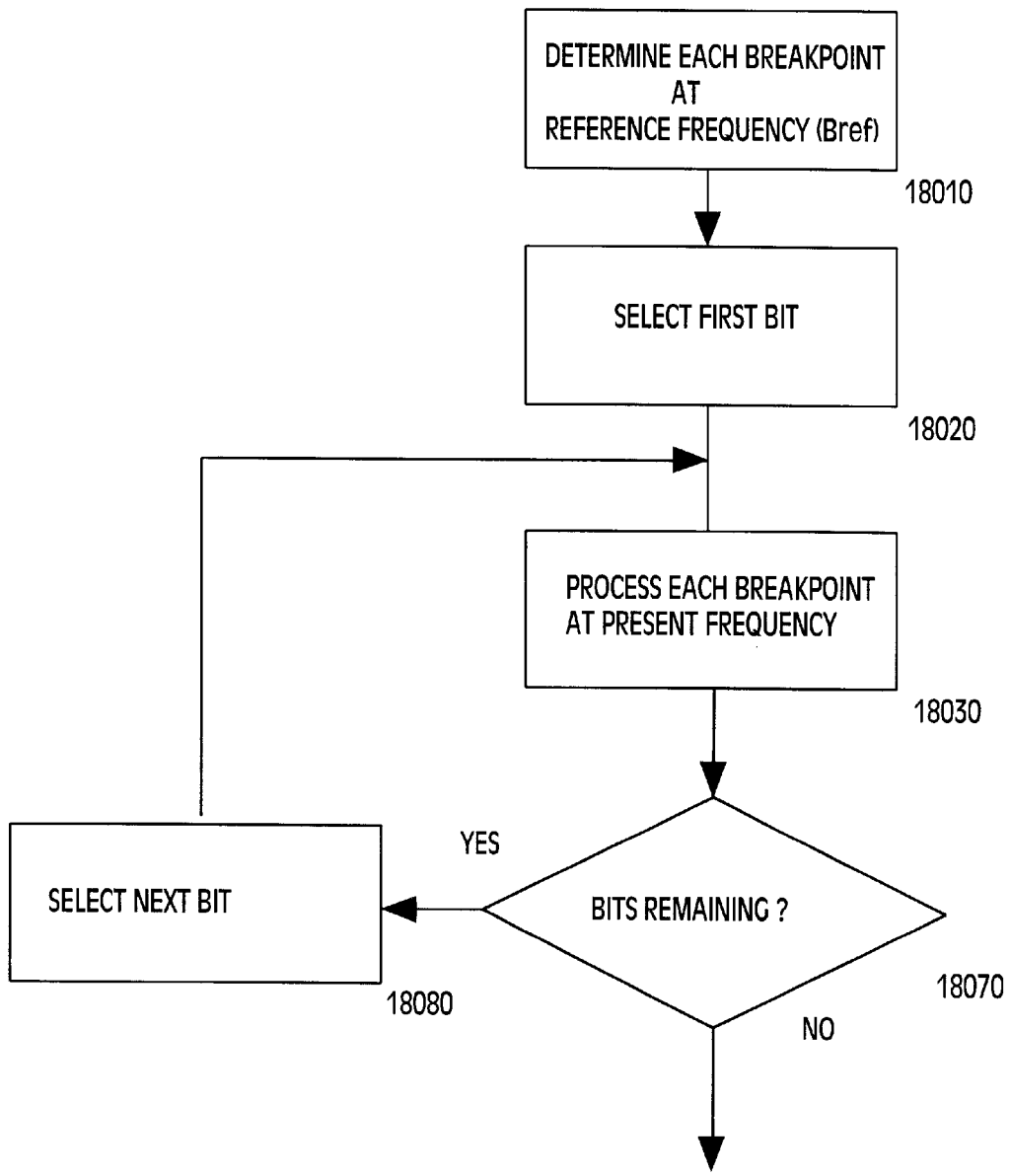
FIG. 18 is a flow chart of a processing performed by the second preferred system.

FIG. 18 shows a procedure, performed by processor 1200 and program 1216, for reading labels 2020, 2025, and 2030. This procedure exploits the fact that the circuits within a particular label will have breakpoints in proximity to each other, because each circuit within a particular label will have a substantially common combination of distance relative to transmitting antenna 1110 and orientation relative to antenna 1110. Because the circuits within a label have a substantially common breakpoint, the label may be conceptualized as having this common breakpoint. In other words, this procedure exploits the fact that each label will usually exhibit a unique breakpoint, because each label will have a unique combination of distance relative to transmitting antenna 1110 and orientation relative to transmitting antenna 1110.

First, processor 1200 detects each breakpoint at the reference frequency and allocates a record for each breakpoint (step 18010). (In the preferred embodiments, when a label is present, there will always be a breakpoint at the reference frequency, because each label has a reference circuit.) Each record includes a REFERENCE—BREAKPOINT field for recording the transmission intensity on antenna 1110 at which the breakpoint occurred, and a LABEL—VALUE field for storing a label value corresponding to the breakpoint stored in the REFERENCE—BREAKPOINT field.

Next, Processor 1200 sets the system to detect the least significant bit, by setting sine wave generator 1116 to the frequency Tbit0 and setting band pass filter 1128 to a band centered around Rbit0. (step 18020). In step 18020, processor 1200 also performs the variable assignment BIT—POSITION =0.

In step 18030, processor 1200 searches for each breakpoint at the presently selected frequency. For each such breakpoint, processor 1200 sets a bit in the LABEL—VALUE field of the record having a REFERENCE—BREAKPOINT field value in proximity to the breakpoint (step1 8030).

Steps 18070 and 18080 repeat step 18030 for the remaining bit positions. In step 18080, processor 1200 sets sine wave generator 1116 to transmission frequency corresponding to a bit position; sets band pass filter 1128 to a center frequency corresponding to the bit position; and performs the variable assignment BIT—POSITION =BIT—POSITION +1.

Figure 19:
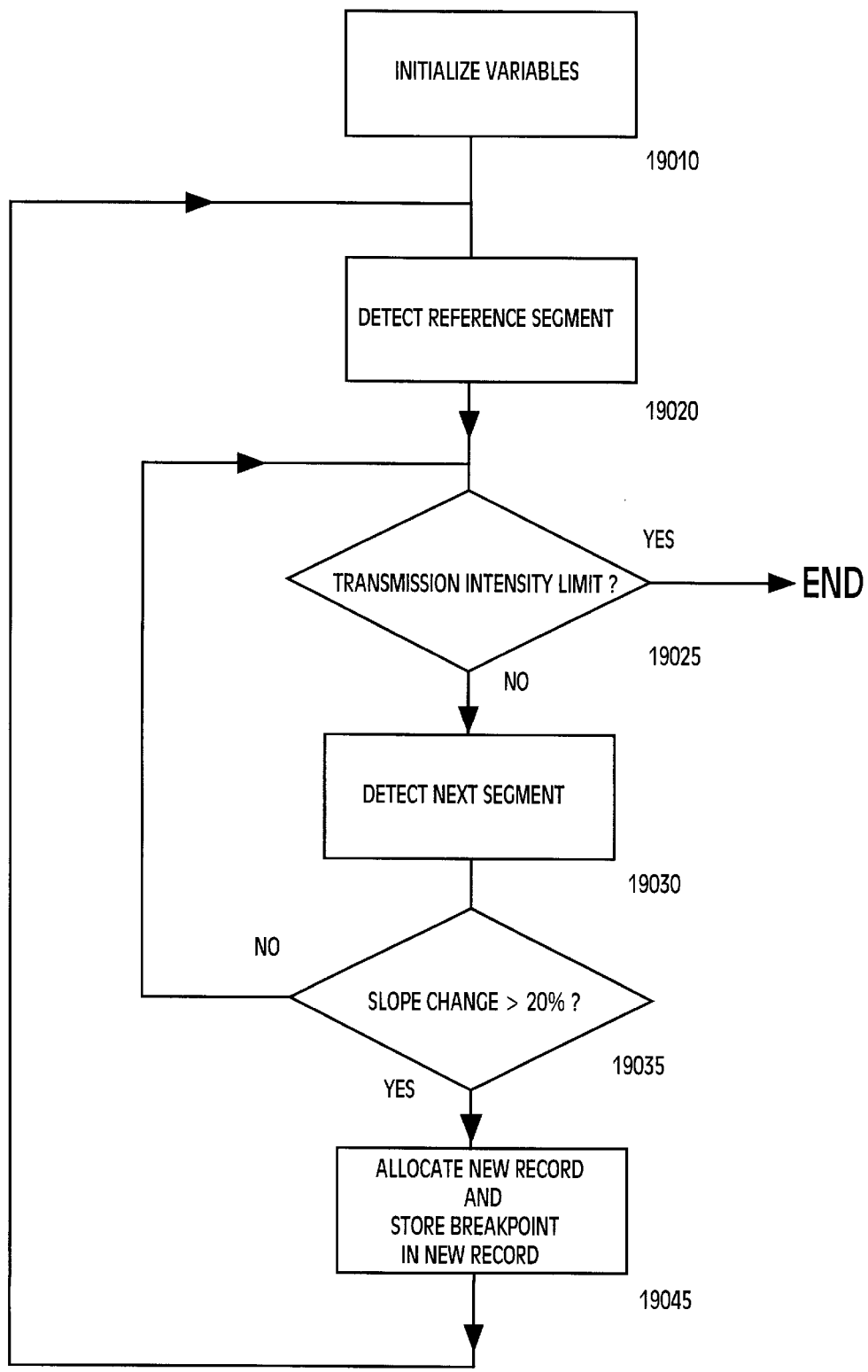
FIG. 19 is a flow chart of a part of the processing shown in FIG. 17.

FIG. 19 shows the procedure of step 18010 shown in FIG. 18 in more detail. The procedure shown in FIG. 19 is similar to that shown in FIG. 11, except that the procedure of FIG. 19 finds multiple breakpoints. Instead of terminating after a breakpoint is found, as is done in the procedure of FIG. 11, the procedure of FIG. 19 records the existence of a found breakpoint and then continues to increment the transmission intensity to search for additional breakpoints. Processor 1200 collects data along a response curve, such as the curve REF_C shown in FIG. 17A. To determine where the breakpoints exist, processor 1200 processes the curve by segments, and detects whether the percentage change in slope between two segments is greater than 20%. More specifically, processor 1200 sets an initial intensity (I1) for amplifier 1118 and sets a variable RECORD—COUNT =0. (step 19010).

In step 19020, processor 1200 detects a reference segment. Processor 1200 causes amplifier 1118 to transmit the present intensity, $TRANSMITTED_T$, on antenna 1110; detects a received intensity, $RECEIVED_T$, (through antenna 1120, filter 1128, demodulator 1127, and A/D converter 1126) by squaring the value on signal line 1173 at the output of A/D converter 1126; performs the variable assignments $TRANSMITTED_1 = TRANSMITTED_T$, $RECEIVED_1 = RECEIVED_T$; increments $TRANSMITTED_T$; causes amplifier 1118 to transmit at $TRANSMITTED_T$; detects a received intensity, $RECEIVED_T$, by squaring the value on signal line 1173; and performs the variable assignments $TRANSMITTED_2 = RETRANSMITTED_T$, $RECEIVED_2 = RECEIVED_T$.

Processor 1200 then determines whether the transmission intensity limit IMAX has been reached, whether $TRANSMITTED_T > IMAX$ (step 19025). If the limit has been reached, the procedure of FIG. 19 ends. Otherwise, processor 1200 detects the next segment by performing the variable assignments $TRANSMITTED_{T-1} = TRANSMITTED_T$, $RECEIVED_{T-1} = RECIEIVED_T$; incrementing $TRANSMITTED_T$ by a constant IDELTA; causing amplifier 1118 to transmit at $TRANSMITTED_T$; and detecting a received intensity $RECEIVED_T$. (step 19030), wherein IDELTA=(IMAX−I1)200.

Processor 1200 then processes a difference between the slope of the current segment ($SLOPE_T$) and the slope of the reference segment ($SLOPE_P$), by comparing the absolute value of the expression $$\frac{SLOPE_P - SLOPE_T}{SLOPE_P}$$

to 0.2 (step 19035), wherein $$SLOPE_P = \frac{RECEIVED_2 - RECEIVED_1}{TRANSMITTED_2 - TRANSMITTED_1},$$

and $$SLOPE_T = \frac{RECEIVED_T - RECEIVED_{T-1}}{TRANSMITTED_T - TRANSMITTED_{T-1}}.$$

If this expression is greater than 0.2, a breakpoint exists and processor 1200 executes step 19045, which performs the variable assignments RECORD_COUNT=RECORD_COUNT+1; R_ARRAY [RECORD_COUNT, REFERENCE_BREAKPOINT]=$TRANSMITTED_T$; R_ARRAY [RECORD_COUNT, LABEL_VALUE]=0; $TRANSMITTED_T = TRANSMITTED_T + 5*IDELTA$, wherein R_ARRAY is an array of records.

Step 19045 increments $TRANSMITTED_T$ by five times IDELTA so that the next part of the curve to be processed will be removed from the breakpoint recorded in the current invocation of step 19045, thereby ensuring that multiple records are not allocated for a single breakpoint. In other words, ensuring that the next curve part is not too close to the currently recorded breakpoint is a safeguard in case the breakpoint is spread out over a curve part of greater than IDELTA.

Figure 20:
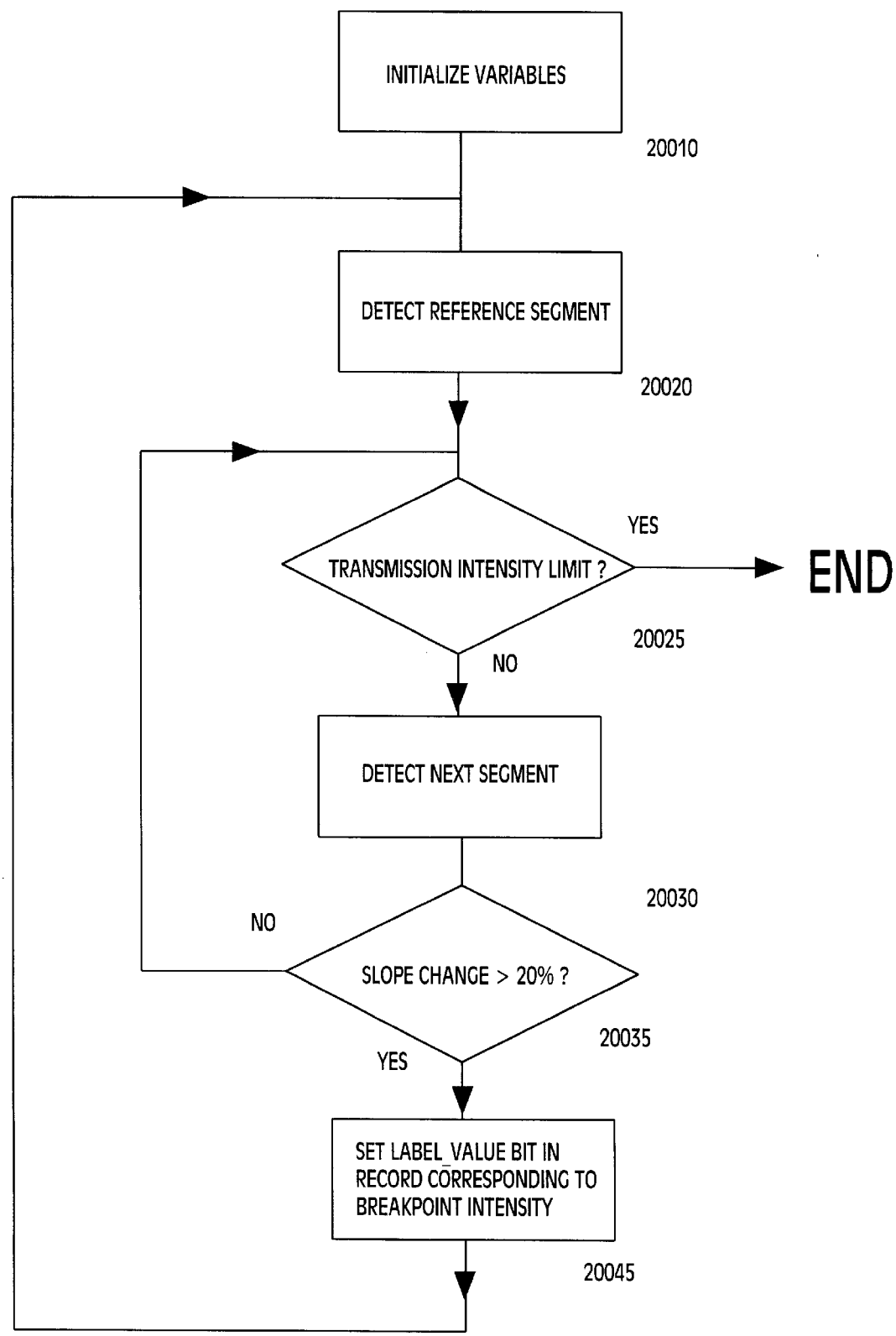
FIG. 20 is a flow chart of another portion of the processing shown in FIG. 17.

FIG. 20 shows a processing of step 18030 of FIG. 18 in more detail. The procedure of FIG. 20 is similar to that of FIG. 19, except that when a breakpoint is processor 1200 searches through each record in R_ARRAY and sets a bit in the LABEL_VALUE field of the record having a REFERENCE_BREAKPOINT near the current breakpoint. Processor 1200 collects data along a response curve, such as the curve $BIT0_{13}$ C shown in FIG. 17B. To determine where the breakpoints exist, processor 1200 processes the curve by segments, and detects whether the percentage change in slope between two segments is greater than 20%. More specifically, processor 1200 sets an initial intensity (I1) for amplifier 1118. (step 20010).

In step 20020, processor 1200 detects a reference segment. Processor 1200 causes amplifier 1118 to transmit the present intensity, TRANSMITTEDT, on antenna 1110; detects a received intensity, $RECEIVED_T$, (through antenna 1120, filter 1128, demodulator 1127, and A/D converter 1126) by squaring the value on signal line 1173 at the output of A/D converter 1126; performs the variable assignments $TRANSMITTED_1 = TRANSMITTED_T$, $RECEIVED_1 = RECEIVED_T$; increments $TRANSMITTED_T$; causes amplifier 1118 to transmit at $TRANSMITTED_T$; detects a received intensity, $RECEIVED_T$, by squaring the value on signal line 1173; and performs the variable assignments $TRANSMITTED_2 = TRANSMITTED_T$, $RECEIVED_2 = RECEIVED_T$.

Processor 1200 then determines whether the transmission intensity limit has been reached (step 20025). If the limit has been reached, the procedure of FIG. 20 ends. Otherwise, processor 1200 detects the next segment by performing the variable assignments $TRANSMITTED_{T-1} = TRANSMITTED_T$, $RECEIVED_{T-1} = RECIEIVED_T$; incrementing $TRANSMITTED_T$; causing amplifier 1118 to transmit at $TRANSMITTED_T$; and detecting a received intensity $RECEIVED_T$. (step 20030). Processor 1200 then processes a difference between the slope of the current segment ($SLOPE_T$) and the slope of the reference segment ($SLOPE_P$), by comparing the absolute value of the expression $$\frac{SLOPE_P - SLOPE_T}{SLOPE_P}$$

to 0.2 (step 20035), wherein $$SLOPE_P = \frac{RECEIVED_2 - RECEIVED_1}{TRANSMITTED_2 - TRANSMITTED_1},$$

and $$SLOPE_T = \frac{RECEIVED_T - RECEIVED_{T-1}}{TRANSMITTED_T - TRANSMITTED_{T-1}}.$$

If this expression is greater than 0.2, a breakpoint exists and processor 1200 executes step 20045, which includes the following FOR loop, show in TABLE 1:

TABLE 1

FOR I=1 TO RECORD_COUNT
   IF ABS (R_ARRAY [I, REFERENCE_BREAKPOINT]-
   TRANSMITTED$_T$) <
   INTRA_LABEL_VARIANCE
   THEN
     R_ARRAY [I, LABEL_VALUE] =
     R_ARRAY [I, LABEL_VALUE] OR (1^BIT_POSITION);

wherein I is a variable used to index to a particular record, INTRA_LABEL_VARIANCE is a constant having a value reflecting differences between the resonant circuits of a given label, OR is a bit wise logical OR operator, and "^" is a shift operator: 1^0=1 (0001 binary), 1^1=2 (0010 binary), 1^2=4 (0100 binary), 1^3=8 (1000 binary), etc. After executing this FOR LOOP, step 20045 performs the following variable assignment TRANSMITTED$_T$=TRANSMITTED$_T$5*IDELTA.

Processing of the second preferred method to read labels 2020, 2025, and 2030 shown in FIG. 12, will now be described in more detail. In the program fragments shown in the description below, text appearing after and exclamation points ("!") denotes comments for documenting a program statement. These comments are for the benefit of a person reading the program and are not executed by processor 1200.
Detection of Breakpoint for Each Label Processor 1200 determines each breakpoint at the reference frequency by setting sine wave generator 116 to the frequency to Tref and setting band pass filter 1128 to a band centered around Rref and executing the procedure outlined in FIG. 19 (step 18010). In FIG. 19, after executing step 19010, the first execution of step 19020 detects a reference segment between I1 and I1+IDELTA. In accordance with the previous description of FIG. 17A, the value of SLOPE$_p$ is 1.13. Subsequently, processor 1200 repeatedly executes steps 19025, 19030, and 19035 until step 19030 detects a breakpoint segment, having a slope at least 20% different than SLOPE$_p$. In other words, processor 1200 repeatedly executes steps 19025, 19030, and 19035 the SLOPE$_T$ will be less than 0.904. (Although the slope of the curve REF_C is 0.42 between I2 and I3, the breakpoint segment detected in step 19030 may straddle intensity I2, resulting in a value of SLOPE$_T$ of between 1.13 and 0.42.) Step 19045 then executes the instructions:

---

!
! Set RECORD_COUNT to 1.
RECORD_COUNT = RECORD_COUNT + 1;
!
! Record the first reference breakpoint.

-continued

This will be a number in proximity to I2.
!
R_ARRAY [RECORD_COUNT,
   REFERENCE_BREAKPOINT]=TRANSMITTED$_T$;
!
! Clear label value field for subquent detection of
   the label value for this first reference
! breakpoint
!
R_ARRAY [RECORD_COUNT,
!
   LABEL_VALUE]=0;
! Set next intensity away from presently-recorded breakpoint,
   to prevent unwanted
! redetection of the breakpoint.
!
TRANSMITTED$_T$=TRANSMITTED$_T$+5 * IDELTA

---

Step 19020 then detects a new reference segment, having a slope of 0.42. Processor 1200 then repeatedly executes steps 19025, 19030, and 19035 until step 19030 detects a segment, having a slope of 0.336 or less (0.336 being 20% different from 0.42).

Step 19045 then executes the instructions:

---

!
! Set RECORD_COUNT to 2.
!
! RECORD_COUNT = RECORD_COUNT + 1;
! Record the second reference breakpoint.
   This will be a number in proximity to I3.
!
! R_ARRAY [RECORD_COUNT,
   REFERENCE_BREAKPOINT]=TRANSMITTED$_T$;
!
! Clear label value field for subquent detection of
   the label value for second reference
! breakpoint
!
R_ARRAY [RECORD_COUNT,
   LABEL_VALUE]=0;
! Set next intensity away from
   presently-recorded breakpoint, to prevent unwanted
! redetection of the breakpoint.
!
TRANSMITTED$_T$=TRANSMITTED$_T$+5 * IDELTA

---

Step 19020 then detects a new reference segment, having a slope of 0.14. Processor 1200 then repeatedly executes steps 19025, 19030, and 19035 until step 19030 detects a segment, having a slope of 0.112 or less (0.112 being 20% different than 0.14).

Step 19045 then executes the instructions:

---

!
! Set RECORD_COUNT to 3.
!
RECORD_COUNT = RECORD_COUNT + 1;
!
! Record the third reference breakpoint.
   This will be a number in proximity to I4.
!
R_ARRAY [RECORD_COUNT,
   REFERENCE_BREAKPOINT]=TRANSMITTED$_T$;
!
! Clear label value field for subquent detection of
   the label value for this third reference
! breakpoint
!

-continued

```
R_ARRAY [RECORD_COUNT,
   LABEL_VALUE]=0;
!
! Set next intensity away from presently-recorded
   breakpoint, to prevent unwanted
! redetection of the breakpoint.
!
TRANSMITTED_T=TRANSMITTED_T+5 * IDELTA
```

Step 19020 then detects a reference segment, having a slope of 0. Processor 1200 then repeatedly executes 19025, 19030, and 19035 until TRANSMITTED$_T$ is greater than IMAX, at which point the procedure of FIG. 19 terminates.

Thus, after execution of step 18010, processor 1200 has allocated three records, each with a LABEL_VALUE field of 0. The FOR loop shown in TABLE 1 above is a loop FROM 1 TO 3, because RECORD_COUNT is equal to 3.

Detection of Bit0 for Each Label

Processor 1200 then sets the system to detect the least significant bit, by setting sine wave generator 1116 to the frequency Tbit0 and setting band pass filter 1128 to a band centered around Rbit0; and performs the variable assignment BIT_POSITION=0. (step 18020). Processor 1200 then processes each breakpoint at the transmitted frequency Tbit0, (step 18030), by executing the procedure outlined in FIG. 20. In other words, processor 1200 collects data along the response curve bit0_C shown in FIG. 17B.

After setting an initial intensity of I1 for amplifier 1118 (step 20010), processor 1200 detects a reference segment between I1 and I1 +IDELTA, having a slope of 0.85. Processor 1200 then repeatedly executes steps 20025, 20030, and 20035 until step 20030 detects a breakpoint segment, having a slope of 0.68 or less (0.68 being 20% less than 0.85). Now, TRANSMITTED$_T$ has a value in the vicinity of I2. Thus, when processor 1200 executes the FOR loop of step 20045, shown in TABLE 1 above, the IF statement condition will be true the first time through the loop, because R_ARRAY [1, REFERENCE_BREAKPOINT] also has a value in the vicinity of I2. More specifically, the following expression will be true:

ABS (R_ARRAY [1, REFERENCE_BREAKPOINT]-TRANSMITTED$_T$)<INTRA_LABEL_VARIANCE.

Thus, the first time through the loop processor 1200 executes the THEN clause of TABLE 1:

R_ARRAY [1, LABEL_VALUE]=0000 or 1˜0.

Thus, immediately after this invocation of step 20045, R_ARRAY [1, LABEL_VALUE] is equal to 0001, R_ARRAY [2, LABEL_VALUE] is equal to 0000, and R_ARRAY[3, LABEL_VALUE] is equal to 0000.

Subsequently, step 20045 detects a reference segment between I2 and I4, having a slope of 0.14. Subsequently, processor 1200 executes steps 20025, 20030, and 20035, until step 20030 detects a segment extending past intensity I4, having a slope of 0.112 or less (0.112 being 20% less than 0.14). Now, TRANSMITTED$_T$ has a value in the vicinity of I4. Thus, when processor 1200 executes the FOR loop of step 20045, shown in TABLE 1 above, the IF statement condition will be true the third time through the loop, because R_ARRAY [3, REFERENCE_BREAKPOINT] also has a value in the vicinity of I4. More specifically, the following expression will be true:

ABS (R_ARRAY [3, REFERENCE_BREAKPOINT]-TRANSMITTED$_T$)INTRA_LABEL_VARIANCE.

Thus, the third time through the loop processor 1200 executes the THEN clause of TABLE 1:

R_ARRAY [3, LABEL_VALUE]=0000 or 1˜0.

Thus, immediately after this invocation of step 20045, R_ARRAY [1, LABEL_VALUE] is equal to 0001, R_ARRAY [2, LABEL_VALUE] is equal to 0000, and R_ARRAY[3, LABEL_VALUE] is equal to 0001.

Subsequently, step 20020 detects a reference segment past intensity I4 having a slope 0. Processor 1200 then repeatedly executes steps 20025, 20030, and 20035 until TRANSMITTED$_T$ >IMAX, and the procedure of FIG. 20 then terminates.

Detection of Bit 1 for Each Label

Processor 1200 then sets the system to detect the next most significant bit, by setting sine wave generator 1116 to the frequency Tbit1 and setting band pass filter 1128 to a band centered around Rbit1; and performs the variable assignment BIT_POSITION=1. (step 18080). Processor 1200 then processes each breakpoint at the transmitted frequency Tbit1, (step 18030), by executing the procedure outlined in FIG. 20. In other words, processor 1200 collects data along the response curve bit1_C shown in FIG. 17C.

After setting an initial intensity of I1 for amplifier 1118 (step 20010), processor 1200 detects a reference segment between I1 and I1+IDELTA, having a slope of 1.13. Processor 1200 then repeatedly executes steps 20025, 20030, and 20035 until step 20030 detects a breakpoint segment, having a slope of 0.90 or less (0.90 being 20% less than 1.13). Now, TRANSMITTED$_T$ has a value in the vicinity of I2. Thus, when processor 1200 executes the FOR loop of step 20045, shown in TABLE 1 above, the IF statement condition will be true the first time through the loop, because R_ARRAY [1, REFERENCE_BREAKPOINT] also has a value in the vicinity of I2. More specifically, the following expression will be true:

ABS (R_ARRAY [1, REFERENCE_BREAKPOINT]-TRANSMITTED$_T$)INTRA_LABEL_VARIANCE.

Thus, the first time through the loop processor 1200 executes the THEN clause of TABLE 1:

R_ARRAY [1, LABLE_VALUE]=0001 or 1˜1.

Thus, immediately after this invocation of step 20045, R_ARRAY [1, LABLE_VALUE] is equal to 0011, R_ARRAY [2, LABLE_VALUE] is equal to 0000, and R_ARRAY [3, LABLE_VALUE] is equal to 0001.

Subsequently, step 20045 detects a reference segment between I2 and I3, having a slope of 0.42. Subsequently, processor 1200 executes steps 20025, 20030, and 20035, until step 20030 detects a segment, having a slope of 0.34 or less (0.34 being 20% less than 0.42). Now, TRANSMITTED$_T$ has a value in the vicinity of I3. Thus, when processor 1200 executes the FOR loop of step 20045, shown in TABLE 1 above, the IF statement condition will be true the second time through the loop, because R_ARRAY [2, REFERENCE_BREAKPOINT] also has a value in the vicinity of I3. More specifically, the following expression will be true:

ABS (R_ARRAY [2, REFERENCE_BREAKPOINT]-TRANSMITTED$_T$)INTRA_LABEL_VARIANCE.

Thus, the second time through the loop processor 1200 executes the THEN clause of TABLE 1:

R_ARRAY [2, LABLE_VALUE]=0000 or 1^1.

Thus, immediately after this invocation of step 20045, R_ARRAY [1, LABLE_VALUE] is equal to 0011, R_ARRAY [2, LABLE_VALUE] is equal to 0010, and R_ARRAY [3, LABLE_VALUE] is equal to 0001.

Subsequently, step 20045 detects a reference segment between I3 and I4, having a slope of 0.14. Subsequently, processor 1200 executes steps 20025, 20030, and 20035, until step 20030 detects a segment, having a slope of 0.11 or less (0.11 being 20% less than 0.14). Now, TRANSMITTED$_T$ has a value in the vicinity of I4. Thus, when processor 1200 executes the FOR loop of step 20045, shown in TABLE 1 above, the IF statement condition will be true the third time through the loop, because R_ARRAY [3, REFERENCE_BREAKPOINT] also has a value in the vicinity of I4. More specifically, the following expression will be true:

ABS (R_ARRAY [3, REFERENCE_BREAKPOINT]–TRANSMITTED$_T$)INTRA_LABEL_VARIANCE.

Thus, the third time through the loop processor 1200 executes the THEN clause of TABLE 1:

R_ARRAY [3, LABLE_VALUE]=0001 or 1^1.

Thus, immediately after this invocation of step 20045, R_ARRAY [1, LABLE_VALUE] is equal to 0011, R_ARRAY [2, LABLE_VALUE] is equal to 0010, and R_ARRAY [3, LABLE_VALUE] is equal to 0011.

Subsequently, step 20020 detects a reference segment past intensity I4 having a slope 0. Processor 1200 then repeatedly executes steps 20025, 20030, and 20035 until TRANSMITTED$_T$ >IMAX, and the procedure of FIG. 20 then terminates.

Detection of Bit 2 for Each Label

Processor 1200 then sets the system to detect the next most significant bit, by setting sine wave generator 1116 to the frequency Tbit2 and setting band pass filter 1128 to a band centered around Rbit2; and performs the variable assignment BIT_POSITION=2. (step 18080). Processor 1200 then attempts to process each breakpoint at the transmitted frequency Tbit2, (step 18030), by executing the procedure outlined in FIG. 20. In other words, processor 1200 collects data along the response curve bit2_C shown in FIG. 17D.

After setting an initial intensity of I1 for amplifier 1118 (step 20010), processor 1200 detects a reference segment between I1 and I1 +IDELTA, having a slope of 0. Processor 1200 then repeatedly executes steps 20025, 20030, and 20035 until TRANSMITTED$_T$ >IMAX, and the procedure of FIG. 20 then terminates.

Detection of Bit 3 for Each Label

Processor 1200 then sets the system to detect the next most significant bit, by setting sine wave generator 1116 to the frequency Tbit3 and setting band pass filter 1128 to a band centered around Rbit3; and performs the variable assignment BIT_POSITION=3. (step 18080). Processor 1200 then processes each breakpoint at the transmitted frequency Tbit3, (step 18030), by executing the procedure outlined in FIG. 20. In other words, processor 1200 collects data along the response curve bit3_C shown in FIG. 17E.

After setting an initial intensity of I1 for amplifier 1118 (step 20010), processor 1200 detects a reference segment between I1 and I1 +IDELTA, having a slope of 0.98. Processor 1200 then repeatedly executes steps 20025, 20030, and 20035 until step 20030 detects a breakpoint segment, having a slope of 0.78 or less (0.78 being 20% less than 0.98). Now, TRANSMITTED$_T$ has a value in the vicinity of I2. Thus, when processor 1200 executes the FOR loop of step 20045, shown in TABLE 1 above, the IF statement condition will be true the first time through the loop, because R_ARRAY [1, REFERENCE_BREAKPOINT] also has a value in the vicinity of I2. More specifically, the following expression will be true:

ABS (R_ARRAY [1, REFERENCE_BREAKPOINT]–TRANSMITTED$_T$)INTRA_LABEL_VARIANCE.

Thus, the first time through the loop processor 1200 executes the THEN clause of TABLE 1:

R_ARRAY [1, LABLE_VALUE]=0011 or 1^3.

Thus, immediately after this invocation of step 20045, R_ARRAY [1, LABLE_VALUE] is equal to 1011, R_ARRAY [2, LABLE_VALUE] is equal to 0010, and R_ARRAY [3, LABLE_VALUE] is equal to 0011.

Subsequently, step 20045 detects a reference segment between I2 and I3, having a slope of 0.27. Subsequently, processor 1200 executes steps 20025, 20030, and 20035, until step 20030 detects a segment, having a slope of 0.22 or less (0.22 being 20% less than 0.27). Now, TRANSMITTED$_T$ has a value in the vicinity of I3. Thus, when processor 1200 executes the FOR loop of step 20045, shown in TABLE 1 above, the IF statement condition will be true the second time through the loop, because R_ARRAY [2, REFERENCE_BREAKPOINT] also has a value in the vicinity of I2. More specifically, the following expression will be true:

ABS (R_ARRAY [2, REFERENCE_BREAKPOINT]–TRANSMITTED$_T$)INTRA_LABEL_VARIANCE.

Thus, the second time through the loop processor 1200 executes the THEN clause of TABLE 1:

R_ARRAY [2, LABLE_VALUE]=0010 or 1^3.

Thus, immediately after this invocation of step 20045, R_ARRAY [1, LABLE_VALUE] is equal to 1011, R_ARRAY [2, LABLE_VALUE] is equal to 1010, and R_ARRAY [3, LABLE_VALUE] is equal to 0011.

Subsequently, step 20045 detects a reference segment after I3, having a slope of 0. Subsequently, processor 1200 executes steps 20025, 20030, and 20035, until TRANSMITTED$_T$ >IMAX, and the procedure of FIG. 20 then terminates.

Thus, for each of labels 2020, 2025, and 2030, processor 1200 determines a respective set of other frequencies of the first signal at which the respective second signal has a nonlinearity corresponding to the respective first transmission amplitude. For label 2025, the set of other frequencies is Tbit1 and Tbit3. For label 2030, the set of other frequencies is Tbit0 and Tbit1.

Thus, the LABLE_VALUE field of each record in R_ARRAY stores an article identification signal for a respective suitcase.

The second preferred method allows for a substantial difference in break down voltage among labels, as long as the differences in break down voltage among the circuits of any particular label does not result in a difference in breakpoints greater than INTRA_LABEL_VARIANCE. Thus, the respective labels may be made from different batches of material and need not be calibrated to the extent that the resonant circuits on any particular label should be calibrated with each other.

The second preferred method detects a breakpoint by comparing the slope of a reference segment (SLOPE$_p$) to a slope of a present segment (SLOPE$_T$). Other methods might be employed to make the breakpoint detection relatively insensitive to the non-linearities caused by natural retransmitters (other than labels) in the environment of the system. For example, a method might be employed that also compares the slopes of adjacent segments.

The constants, such as IDELTA and 5* IDELTA, may be adjusted for an optimum trade off between design goals.

If some mechanical configurations of the preferred system might allow two or more labels to have distances and orientations from the transmitting antenna causing two labels to exhibit reference breakpoints values that are closer than INTRA_LABEL_VARIANCE, this conflict condition can be detected in a number of ways. First, each LABLE_VALUE field could include redundancy bits, such as a checksum or a cyclic redundancy code, allowing the processor to verify a correct LABLE_VALUE. Alternatively, the processor may consult a table after reading a particular LABLE_VALUE, the absence of the LABLE_VALUE in the table indicating this conflict condition.

Alternatively, the processor may compare the sharpness of the breakpoints corresponding to the various one-valued bits in a read code. Normally, similar sharpnessess indicate that the breakpoints correspond to a single label. In this conflict condition, however, the reference breakpoint sharpness may have a relatively high value resulting from multiple labels having the same breakpoint at the reference frequency, while a breakpoint corresponding to a particular bit position may have a substantially lower sharpness resulting from only a single label having the breakpoint.

Although the preferred embodiments of the invention employ resonant tag circuits that retransmit in response to receiving an interrogation signal, the invention may employ other types of schemes, such as detection of interrogator antenna loading caused by the label circuits. In such a system, detuning caused by a voltage limiter in the label circuit limits the loading on the interrogator circuit.

The illustrated conveyor belts move the labels at a slow speed relative to the speed of execution of the preferred methods discussed above. Thus, although movement of the labels relative to the antennas changes the breakpoints, during any particular execution of the preferred method the labels are in a fixed position relative to the antennas.

In the event the conflict condition described above occurs, the preferred methods may be reexecuted after the conveyor belt moves the labels to a new position relative to the antennas. At the new position, the breakpoint positions may have changed such that a conflict no longer exists.

Although the illustrated embodiments of the invention employ a dedicated voltage limiting circuit, in its broadest sense the invention may be practiced without such a dedicated circuit since the preferred methods will process breakpoints in the response of the label circuits, regardless of the origin of such breakpoints.

Figure 21:
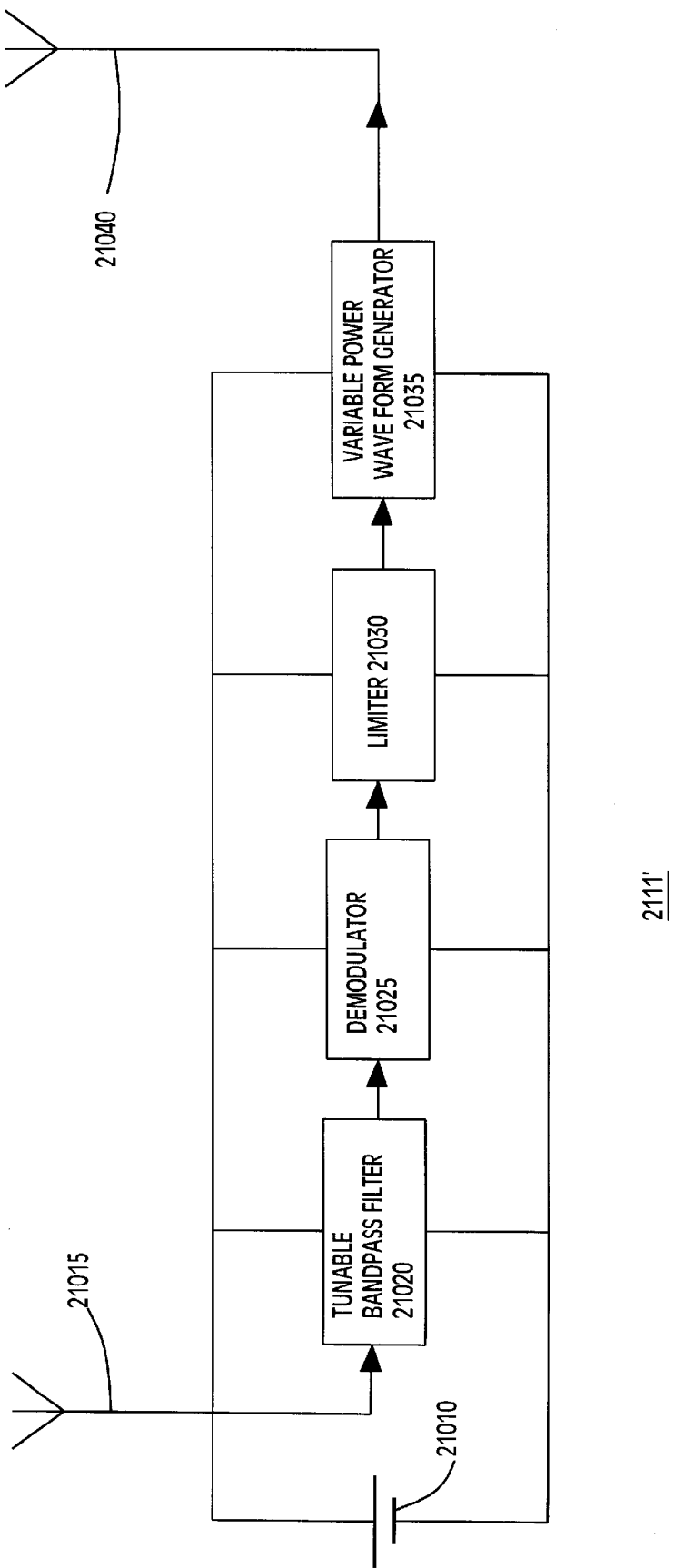
FIG. 21 is a diagram of an identification label circuit in accordance with an alternative embodiment of the present invention.

Conversely, the invention may be practiced with more complicated dedicated circuitry to generate the non-linear response, as shown in FIG. 21. FIG. 21 shows circuit 2111', which is a substitute for circuit 2111 shown in FIG. 5. Circuit 2111' has the responses shown in FIG. 8A and FIG. 9A. Battery 21010 supplies the power to band pass filter 21020, demodulator 21025, limitor 21030, and variable power wave form generator 21035. A signal from a receiving antenna 21015 is filtered by a band pass filter having a pass band centered around Tref. Band pass filter 21020 applies a filtered output to demodulator 21025, which applies a level to limitor 21030. Limitor 21030 has an output that is an increasing function of its input until a certain voltage level is reached at the input, at which point the output remains at a constant maximum value. The output of limitor 21030 controls variable power wave form generator 21035, which transmits a signal having a frequency Rref.

As another alternative, a label circuit might have a comparator and digital logic to generate a non-linear retransmission response. Thus, the invention may be practiced with many types of label circuit having a non-linear response.

Thus, the invention permits label reading in a multi-label environment.

Additional advantages and modifications will readily occur to those skilled in the art and may learned from the practice of the invention. The invention in its broader aspects is therefore not limited to the specific details, representative apparatus, and illustrative examples shown and described. Accordingly, departures may be made from such details without departing from the spirit or the scope of applicant's general inventive concept. The invention is defined in the following claims.

What is claimed is:

1. In a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, a method comprising the steps of:

detecting, for each circuit, the respective amplitude level by varying an amplitude used to transmit the interrogation signal to the plurality of articles; and registering the presence of each article, in response to the previous step.

2. The method of claim 1 wherein the generating step includes generating a respective plurality of digits for each article, each digit corresponding to a respective frequency in the respective set of frequencies.

3. The method of claim 1 further including detecting, for each circuit, a respective set of other nonlinearities corresponding to the respective amplitude level.

4. The method of claim 1 further including detecting, for each circuit, a respective set of other nonlinearities corresponding to the respective amplitude level, by causing the interrogation signal to have a plurality of interrogation signal frequencies.

5. The method of claim 1 wherein detecting the respective amplitude level includes causing the interrogation signal to have a first interrogation signal frequency at a first time, and the method further includes detecting, for each circuit, a respective set of other nonlinearities by causing the interrogation signal to have other interrogation signal frequencies at a time different than the first time.

6. The method of claim 1 wherein registering includes changing a count.

7. The method of claim 1 wherein registering includes allocating a record.

8. In a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, a method comprising the steps of:

detecting, for each circuit, the respective amplitude level by varying an amplitude used to transmit the interrogation signal to the plurality of articles; and recording the presence of each article, in response to the previous step.

9. The method of claim 8 wherein recording includes changing a count.

10. The method of claim 8 wherein recording includes allocating a record.

11. The method of claim 8 further including detecting, for each circuit, a respective set of other nonlinearities corresponding to the respective amplitude level.

12. The method of claim 8 further including detecting, for each circuit, a respective set of other nonlinearities corresponding to the respective amplitude level, by causing the interrogation signal to have a plurality of interrogation signal frequencies.

13. The method of claim 8 wherein detecting the respective amplitude level includes causing the interrogation signal to have a first interrogation signal frequency at a first time, and the method further includes detecting, for each circuit, a respective set of other nonlinearities by causing the interrogation signal to have other interrogation signal frequencies at a time different than the first time.

14. The apparatus of claim 8 wherein the recorder includes a counter.

15. The apparatus of claim 8 wherein the recorder includes a plurality of records.

16. An apparatus for a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, the apparatus comprising:

a detector that detects, for each circuit, the respective amplitude level by varying an amplitude used to transmit the interrogation signal to the plurality of articles, and performing a comparison; and a recorder that records the presence of each article, in response to the comparison.

17. The apparatus of claim 16 further including logic that detects, for each circuit, a respective set of other nonlinearities corresponding to the respective amplitude level.

18. The apparatus of claim 16 further including logic that detects, for each circuit, a respective set of other nonlinearities corresponding to the respective amplitude level, by causing the interrogation signal to have a plurality of interrogation signal frequencies.

19. The apparatus of claim 16 wherein the detector detects the respective amplitude level by causing the interrogation signal to have a first interrogation signal frequency at a first time, and the apparatus further includes logic that detects, for each circuit, a respective set of other nonlinearities by causing the interrogation signal to have other interrogation signal frequencies at a time different than the first time.

20. In a system including a plurality of articles each having a respective circuit for receiving an interrogation signal and transmitting a respective circuit signal, the circuit signal being a function of the interrogation signal, and having a nonlinearity, the nonlinearity corresponding to a respective amplitude level of the interrogation signal, an apparatus comprising:

means for detecting, for each circuit, the respective amplitude level by varying an amplitude used to transmit the interrogation signal to the plurality of articles, and performing a comparison; and means for recording the presence of each article, in response to the comparison.

21. The apparatus of claim 20 wherein the means for recording includes a counter.

22. The apparatus of claim 20 wherein the means for recording includes a plurality of records.

23. The apparatus of claim 20 further including logic that detects, for each circuit, a respective set of other nonlinearities corresponding to the respective amplitude level.

24. The apparatus of claim 20 further including logic that detects, for each circuit, a respective set of other nonlinearities corresponding to the respective amplitude level, by causing the interrogation signal to have a plurality of interrogation signal frequencies.

25. The apparatus of claim 20 wherein the means for detecting detects the respective amplitude level by causing the interrogation signal to have a first interrogation signal frequency at a first time, and the apparatus further includes logic that detects, for each circuit, a respective set of other nonlinearities by causing the interrogation signal to have other interrogation signal frequencies at a time different than the first time.

\* \* \* \* \*